US009686348B2

(12) United States Patent
Talmor et al.

(10) Patent No.: US 9,686,348 B2
(45) Date of Patent: Jun. 20, 2017

(54) INTER-ENTITY CONNECTION MAPS

(71) Applicant: salesforce.com, inc., San Francisco, CA (US)

(72) Inventors: Alon Talmor, Tel Aviv (IL); Elad Tsur, Zikhron Ya'akov (IL); Amir Cohen, Tel Aviv (IL); Yaniv Zecharya, Tel Aviv (IL); Ran Etzion, Tel Aviv (IL)

(73) Assignee: salesforce.com, inc., San Francisco, CA (US)

( * ) Notice: Subject to any disclaimer, the term of this patent is extended or adjusted under 35 U.S.C. 154(b) by 270 days.

(21) Appl. No.: 14/526,349

(22) Filed: Oct. 28, 2014

(65) Prior Publication Data

US 2015/0120783 A1    Apr. 30, 2015

Related U.S. Application Data

(60) Provisional application No. 61/896,650, filed on Oct. 28, 2013, provisional application No. 61/896,653, filed on Oct. 28, 2013, provisional application No. 61/896,655, filed on Oct. 28, 2013, provisional application No. 61/896,656, filed on Oct. 28, 2013.

(51) Int. Cl.
G06F 17/30    (2006.01)
H04L 29/08    (2006.01)

(52) U.S. Cl.
CPC .......... H04L 67/10 (2013.01); H04L 67/306 (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |

(Continued)

*Primary Examiner* — Wilson Lee
(74) *Attorney, Agent, or Firm* — Haynes Beffel & Wolfeld LLP; Ernest J. Beffel, Jr.

(57) ABSTRACT

The technology disclosed relates to identifying connection maps between entities (persons and organizations) and generating so-called connection stories between them based on the connection maps. The connection stories are graphic and visual representations of the connection paths that present to entities topological and chronological aspects of their relationships with other entities.

20 Claims, 19 Drawing Sheets

Connection Stories

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,185,558 B1* | 5/2012 | Narayanan ........ G06F 17/30958 707/798 |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |
| 2013/0332460 A1* | 12/2013 | Pappas ............. G06F 17/30705 707/740 |
| 2014/0040285 A1* | 2/2014 | Rubinstein .......... G06F 17/3053 707/751 |
| 2015/0127565 A1* | 5/2015 | Chevalier ............. G06Q 10/00 705/319 |
| 2015/0278960 A1* | 10/2015 | Moore ................. G06Q 50/01 705/319 |

* cited by examiner

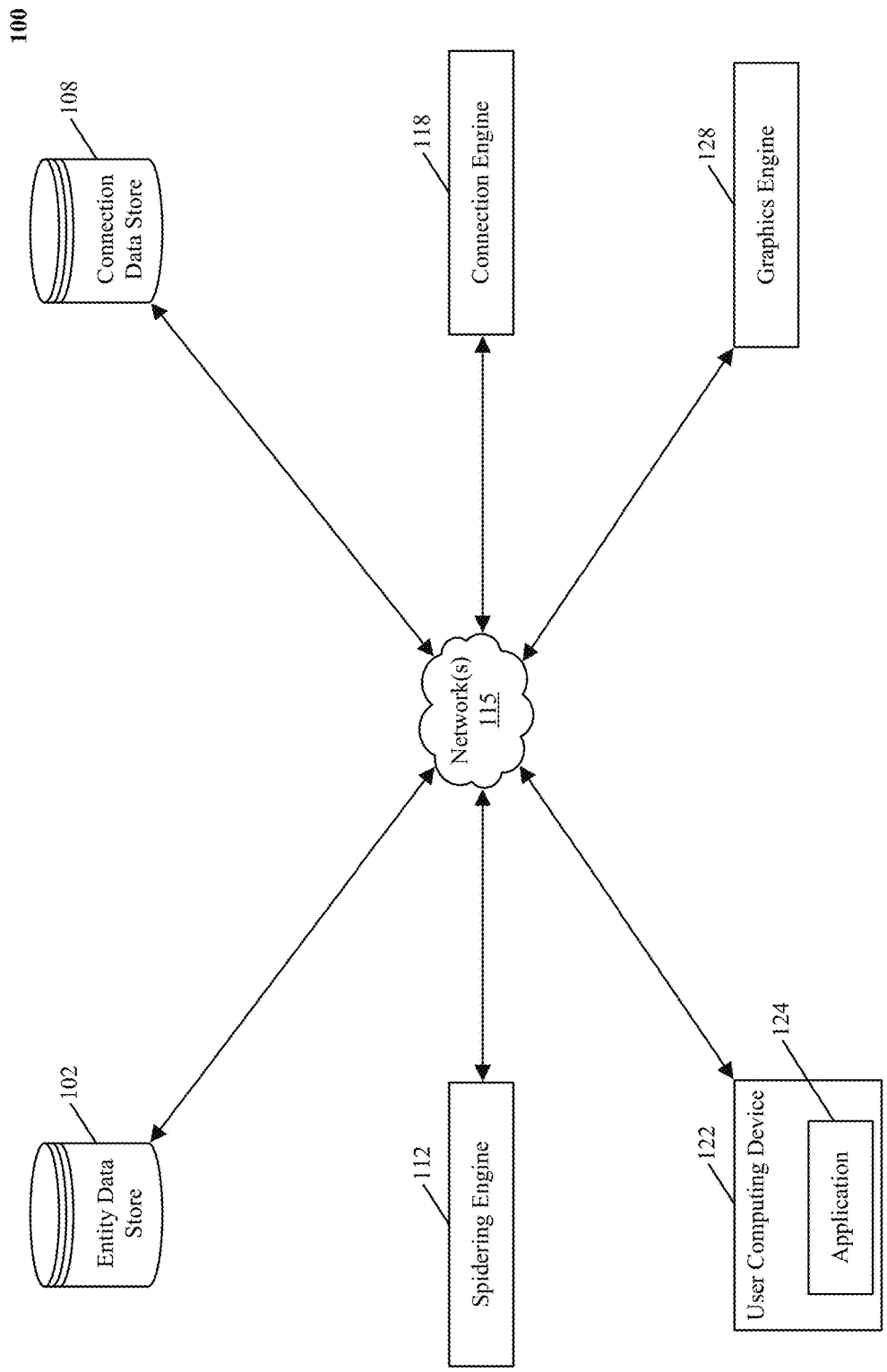
FIG. 1 – Servers, Clients, and Databases

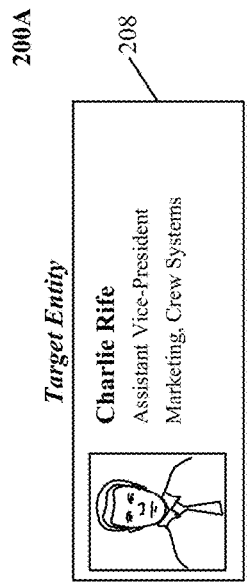
Charlie Rife
Assistant Vice-President
Marketing, Crew Systems
*Target Entity* — 208
200A
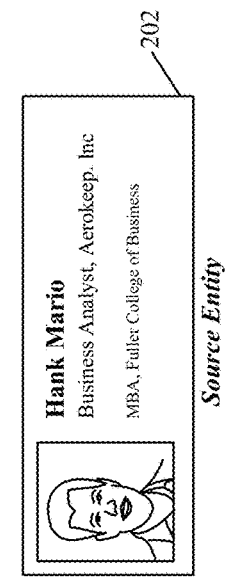
Hank Mario
Business Analyst, Aerokeep, Inc
MBA, Fuller College of Business
*Source Entity* — 202
FIG. 2A – Source and Target Entities

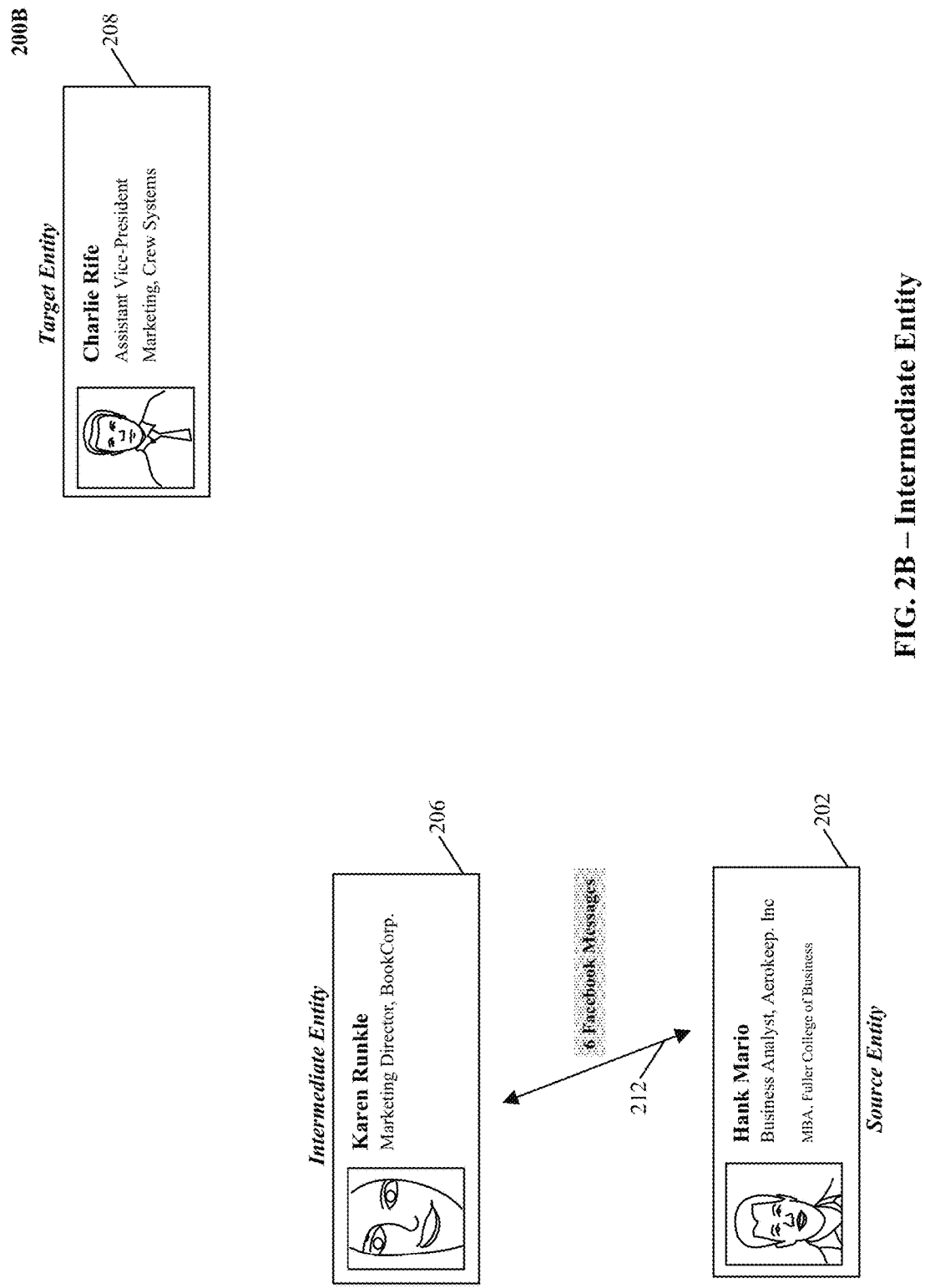
FIG. 2B – Intermediate Entity

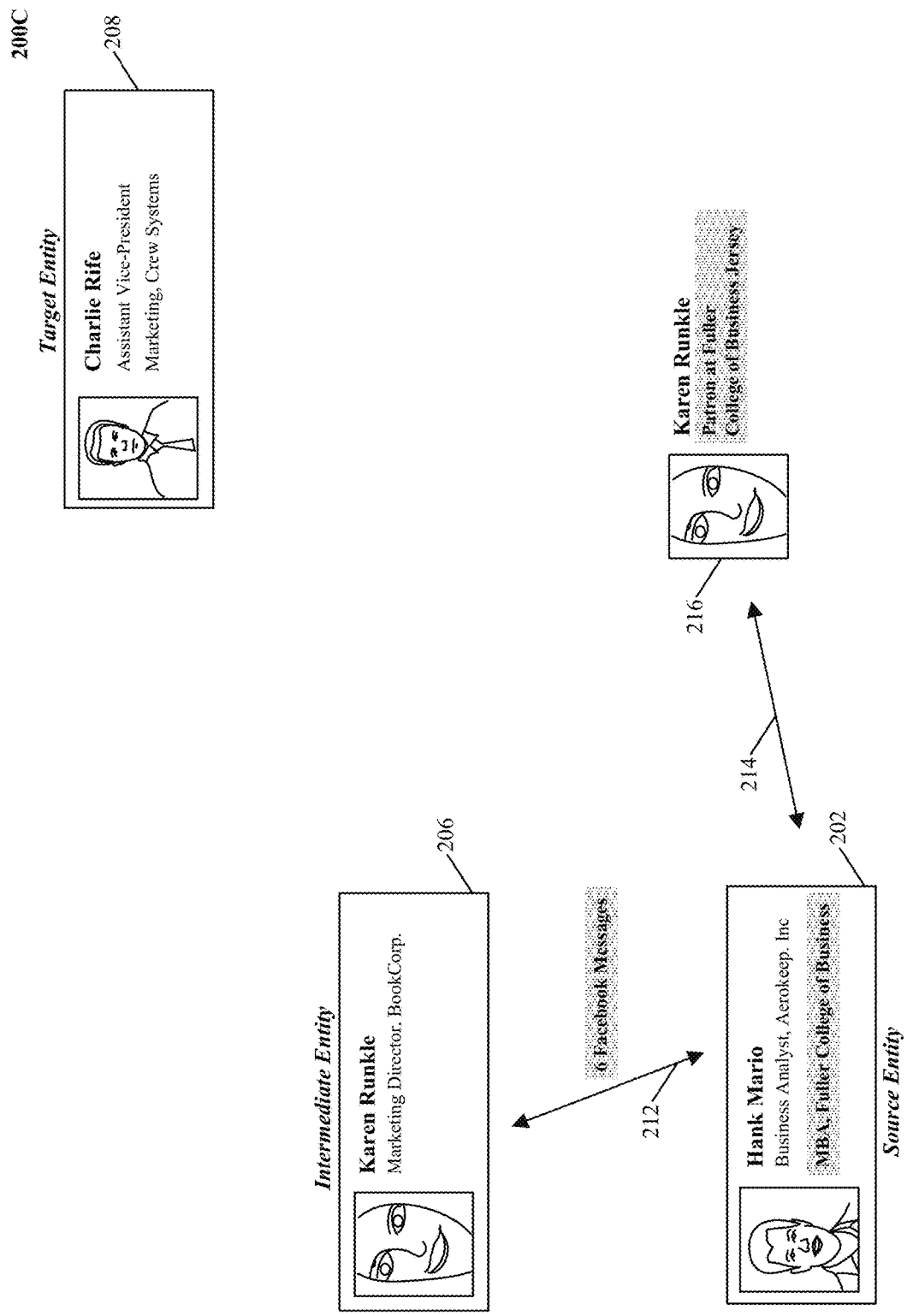
FIG. 2C – Connection Paths

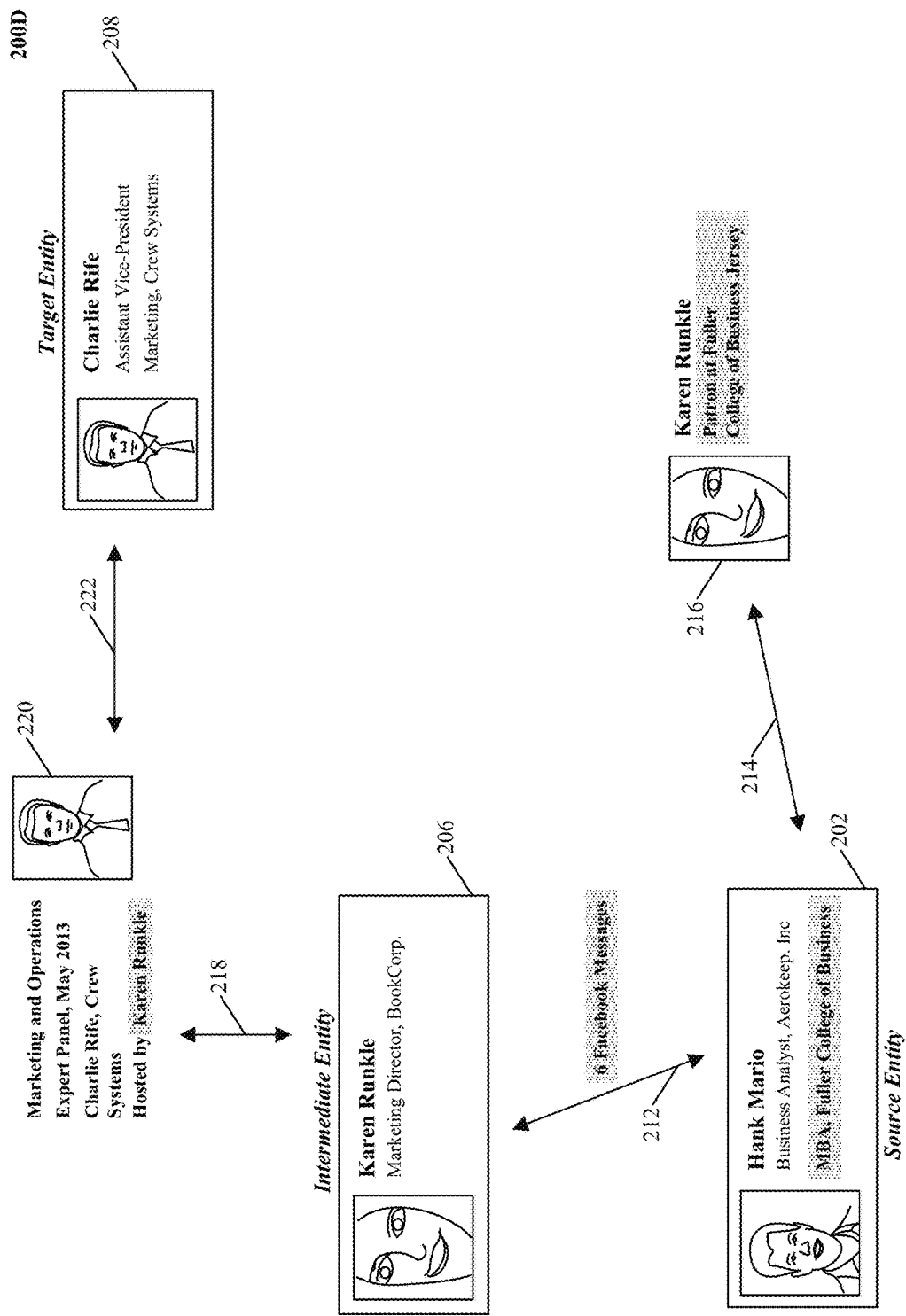
FIG. 2D – Connection Paths

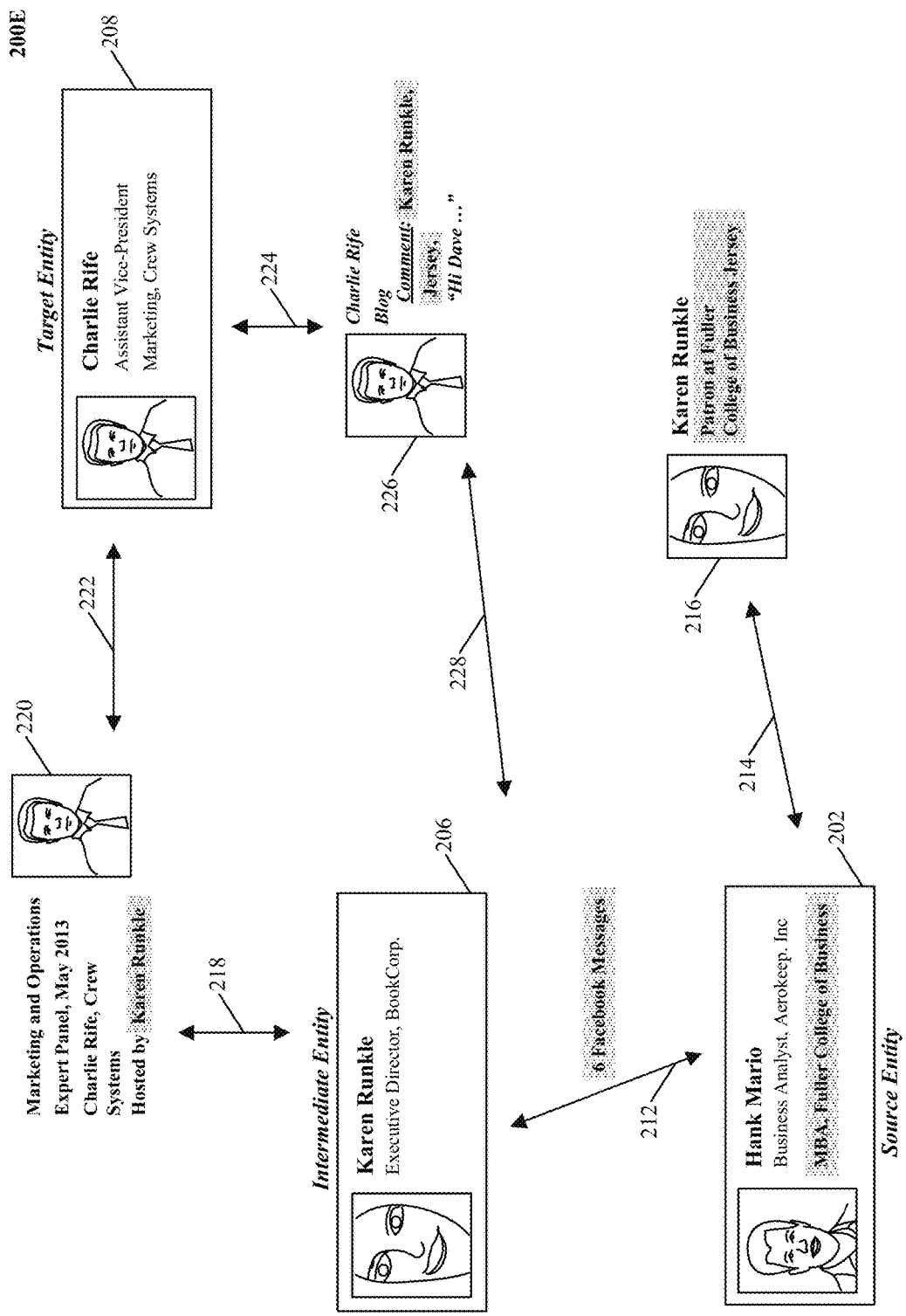
FIG. 2E – Connection Paths

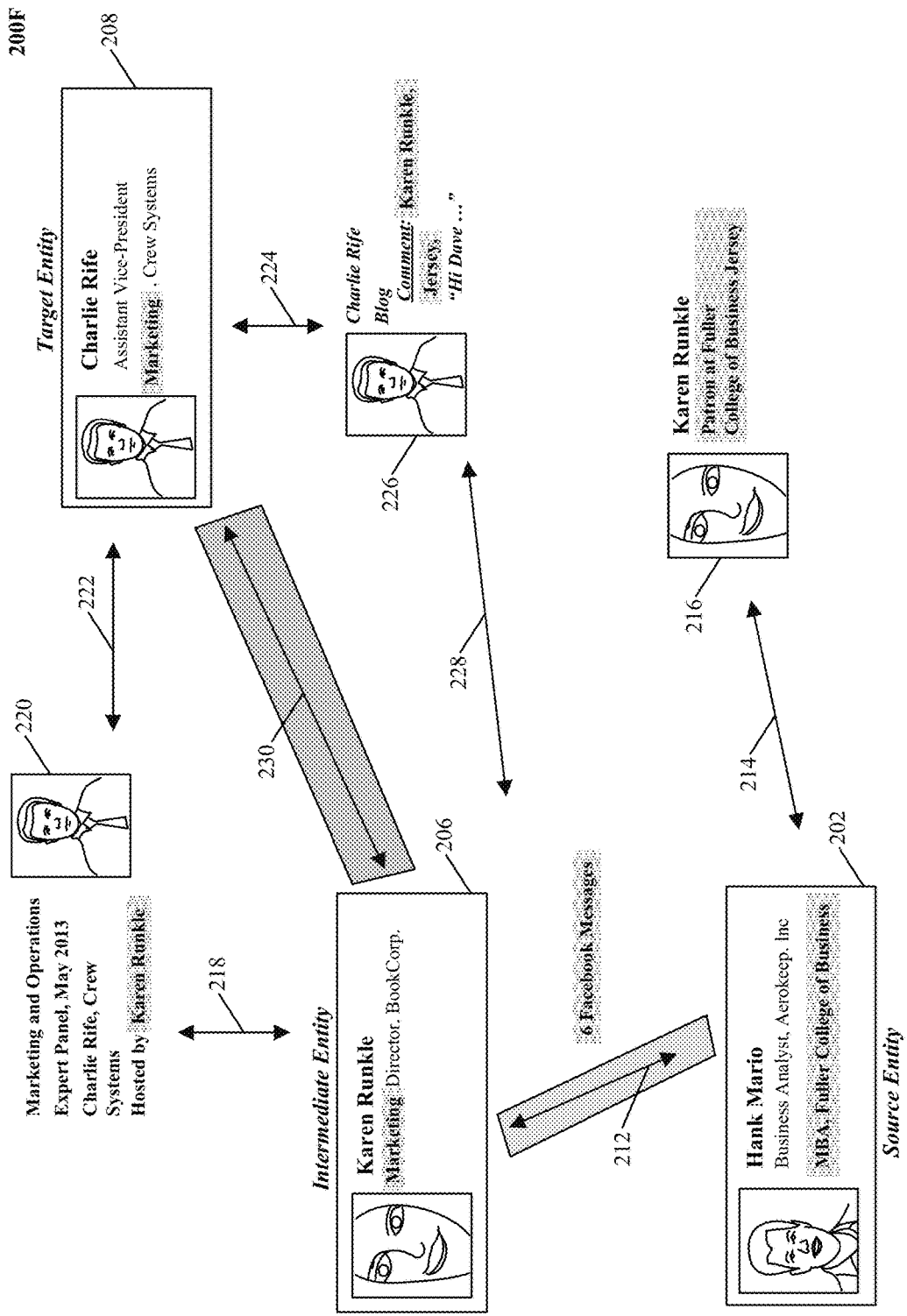
FIG. 2F – Connection Paths

FIG. 3A – Connection Stories

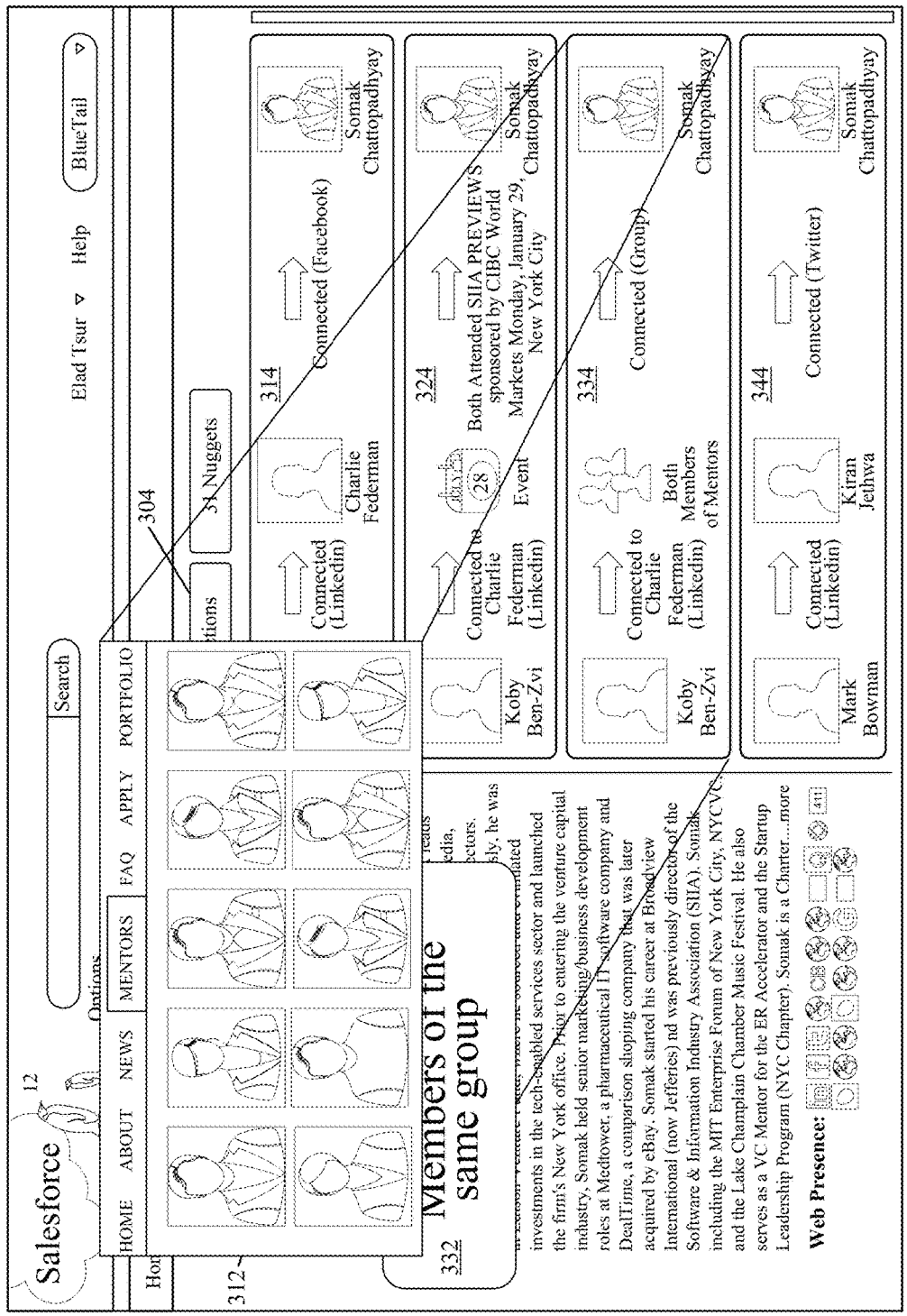
FIG. 3B – Connection Story Drill-Down

FIG. 3C – Connection Story Drill-Down

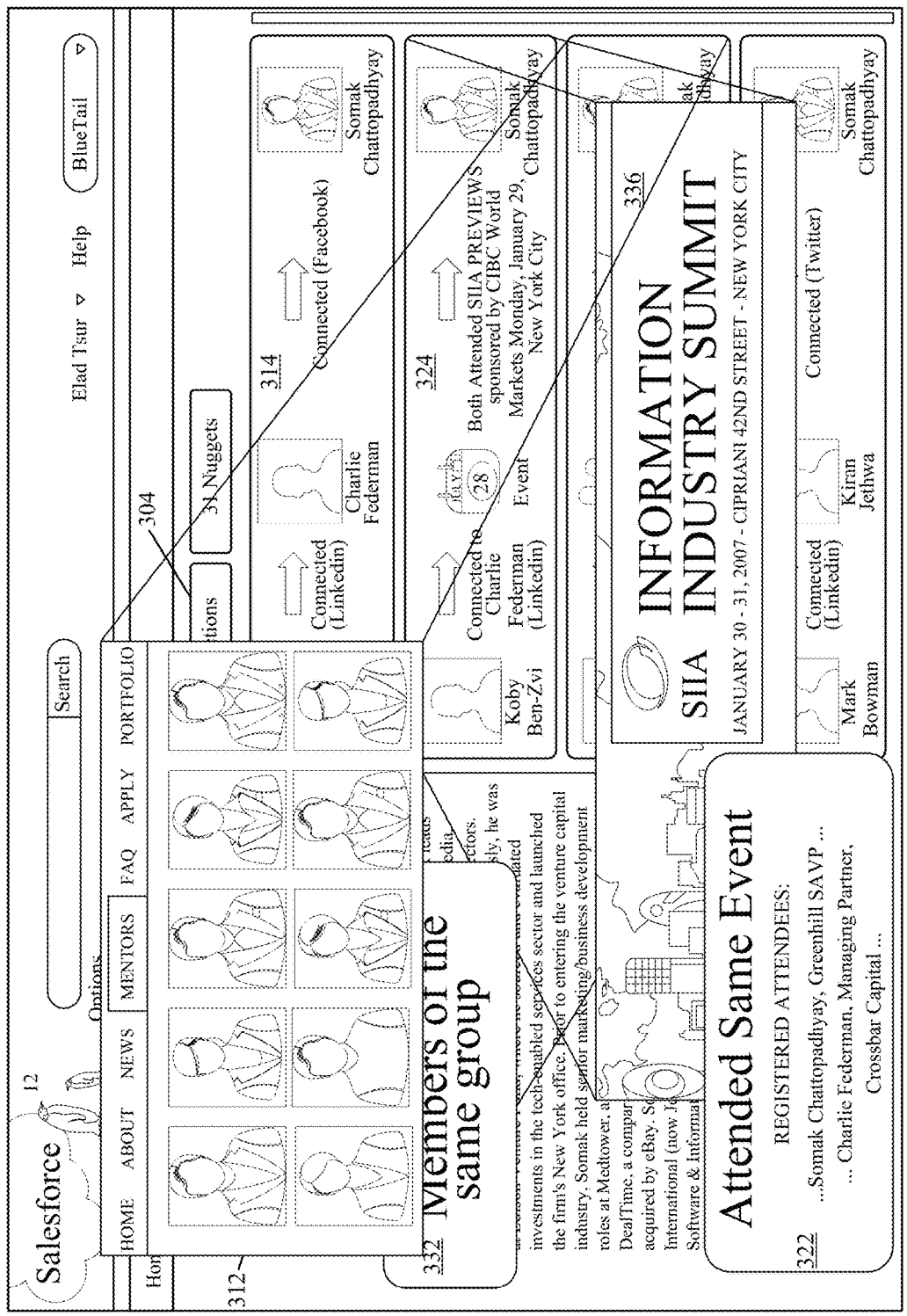
FIG. 3D – Connection Story Drill-Down

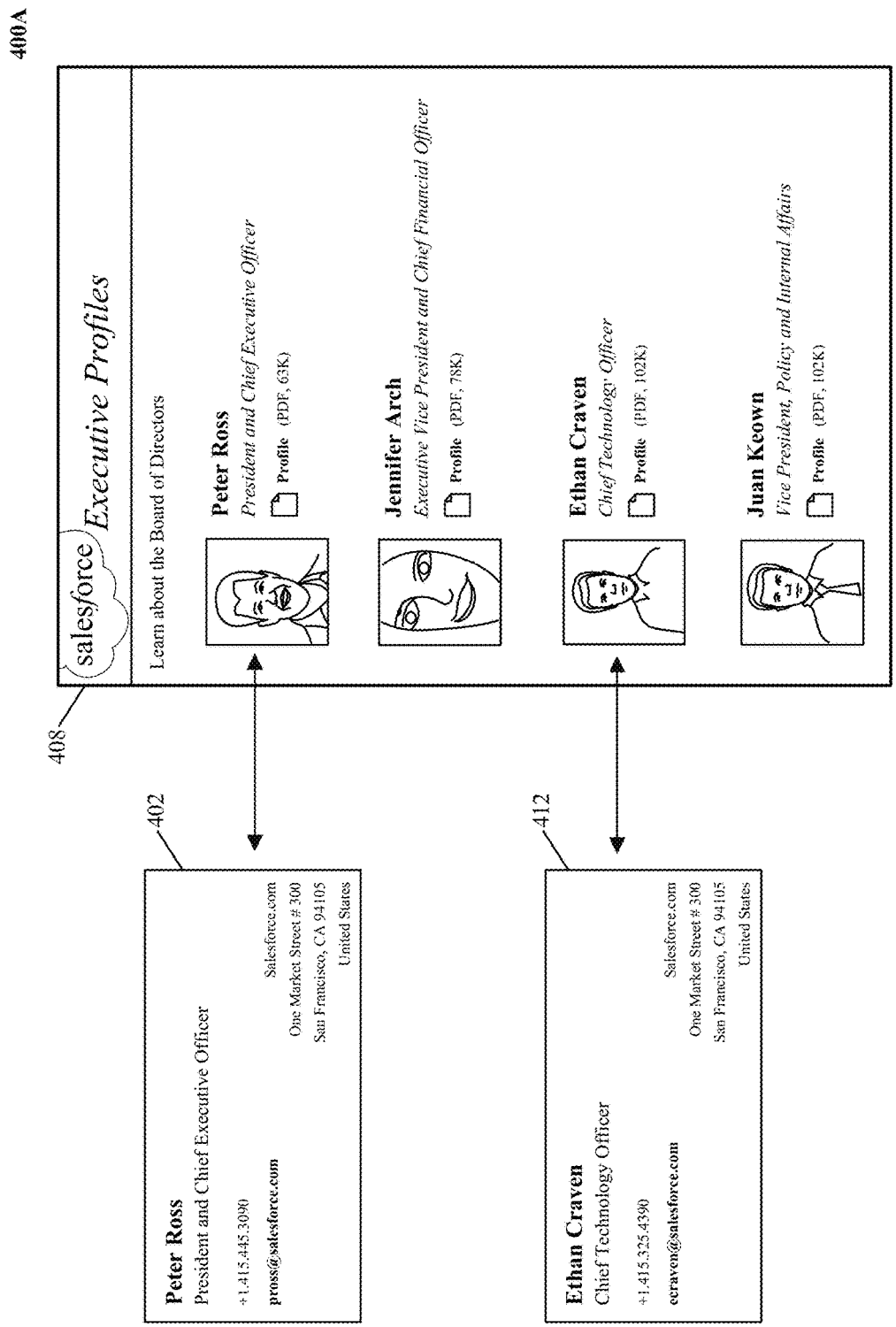
FIG. 4A – Web Page with User Contacts

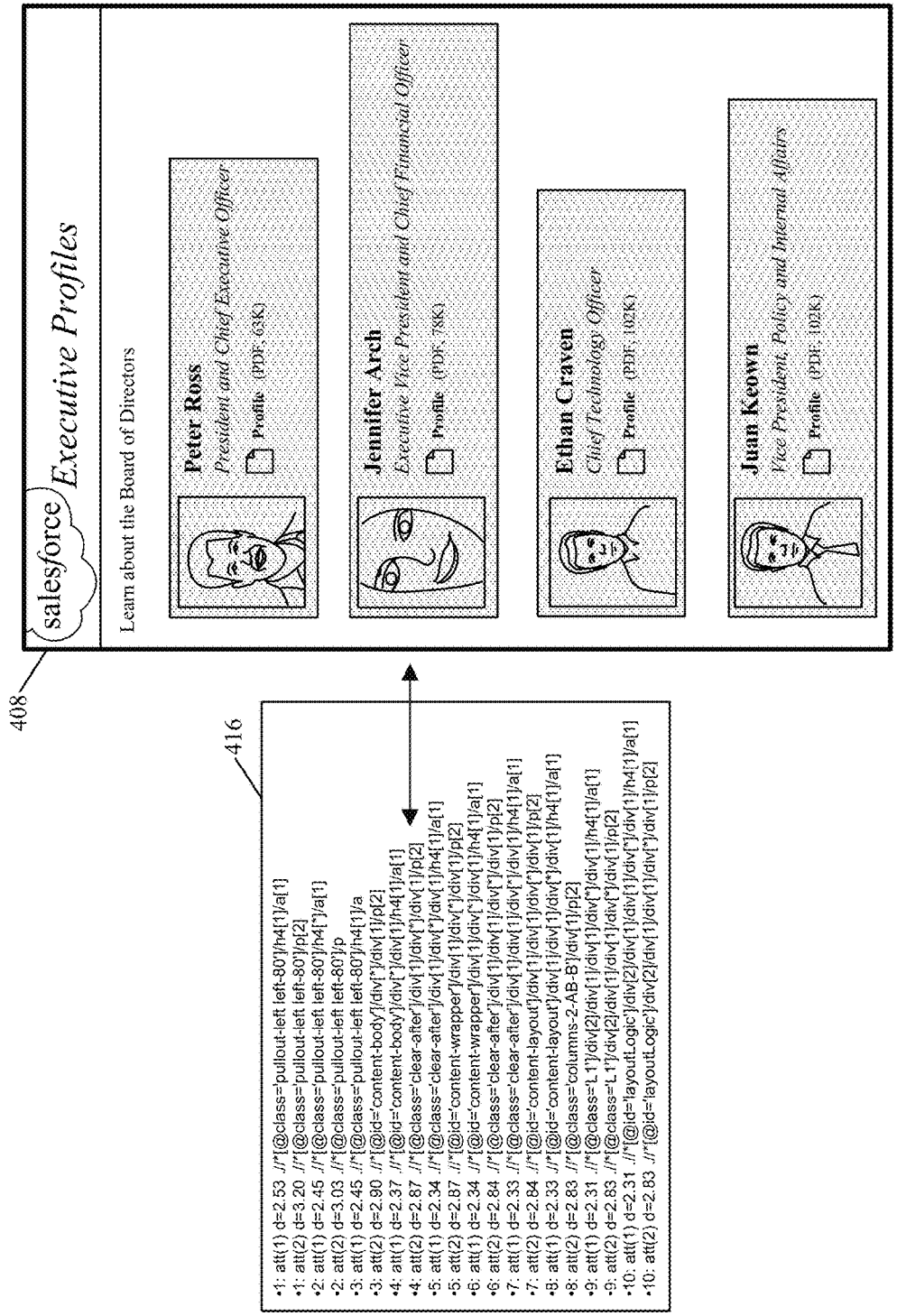
FIG. 4B – XPath Extraction of Contacts

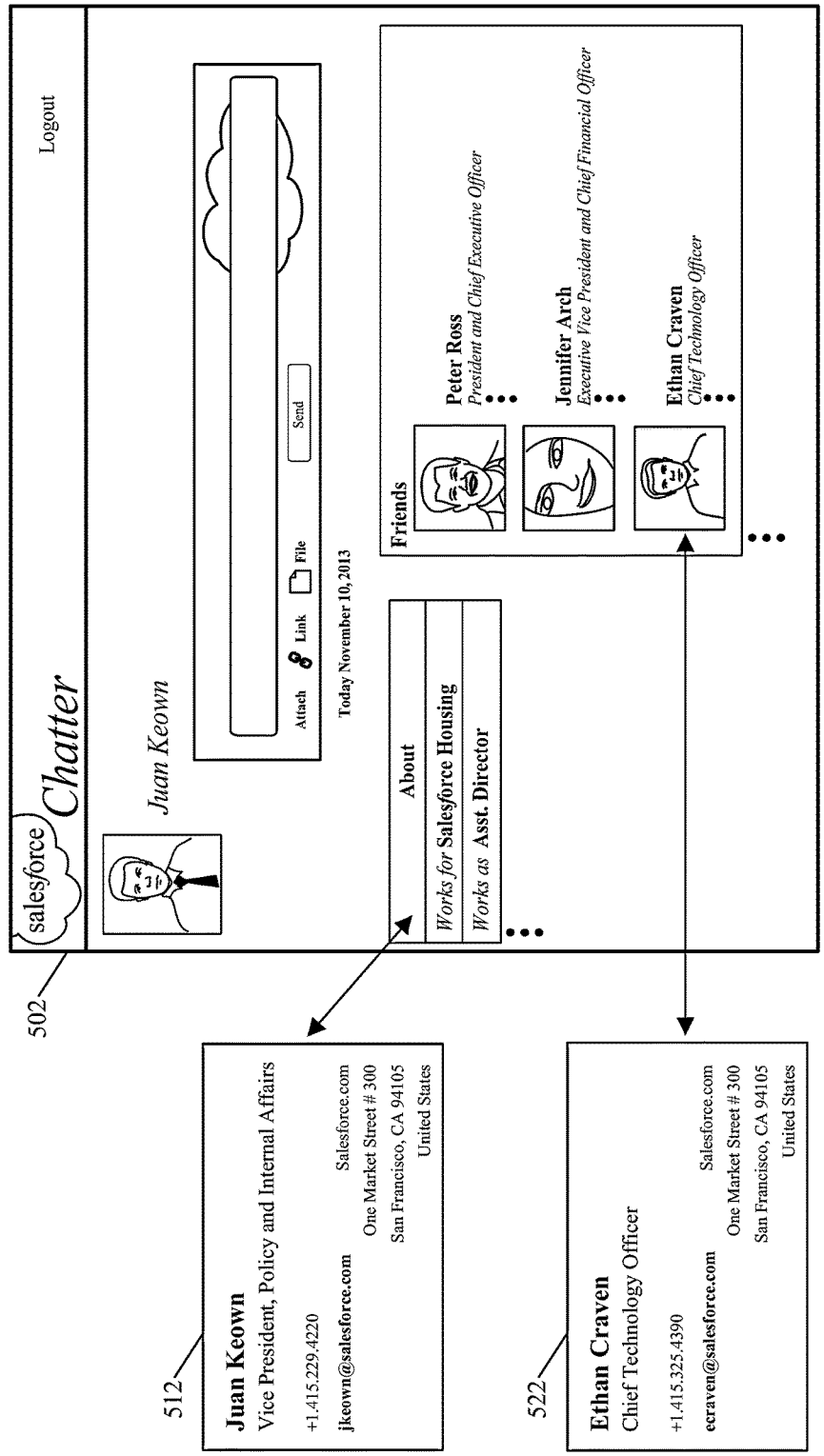
FIG. 5 – Whole Domain Automatic Extraction

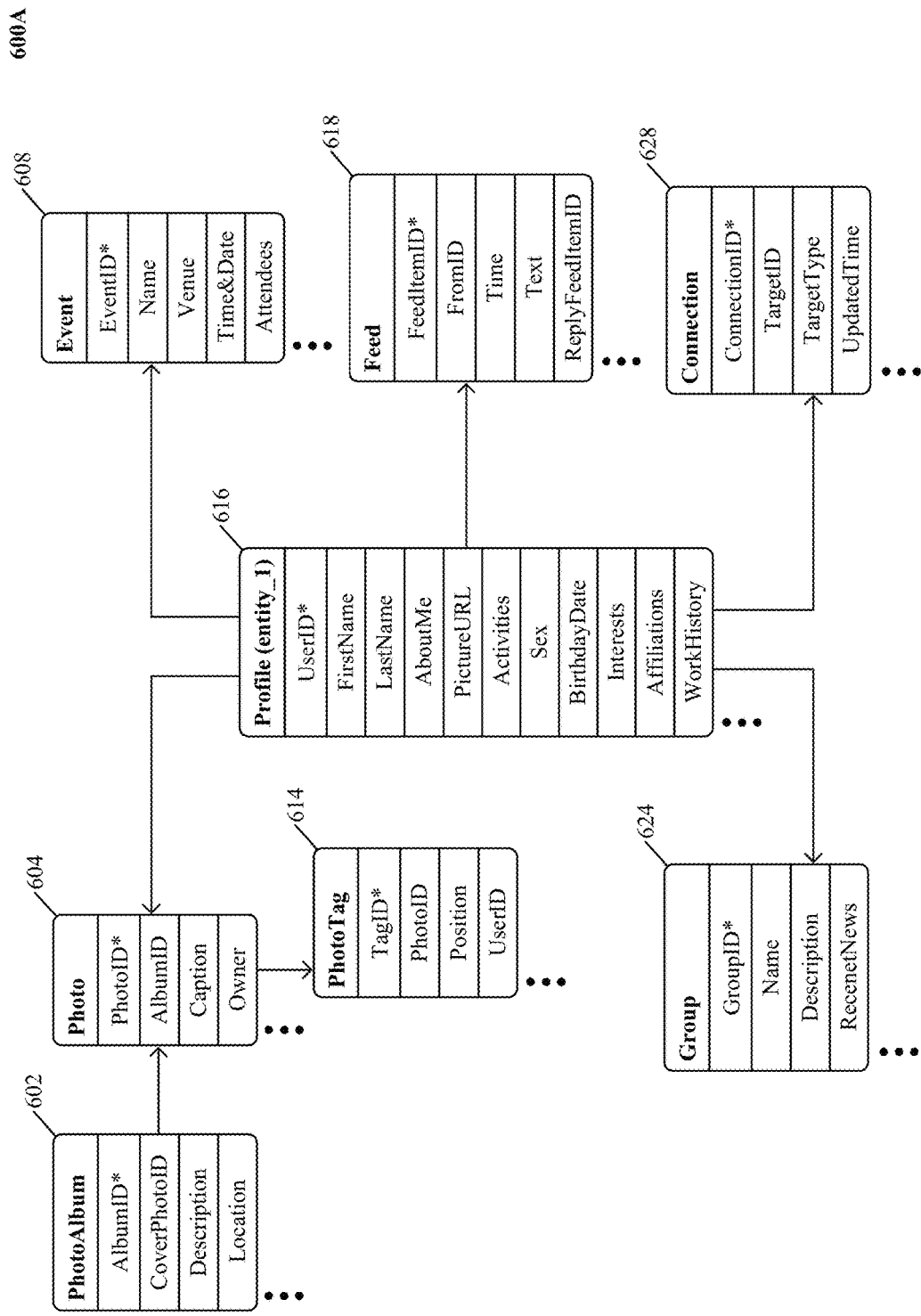
FIG. 6A – User Profile Schema

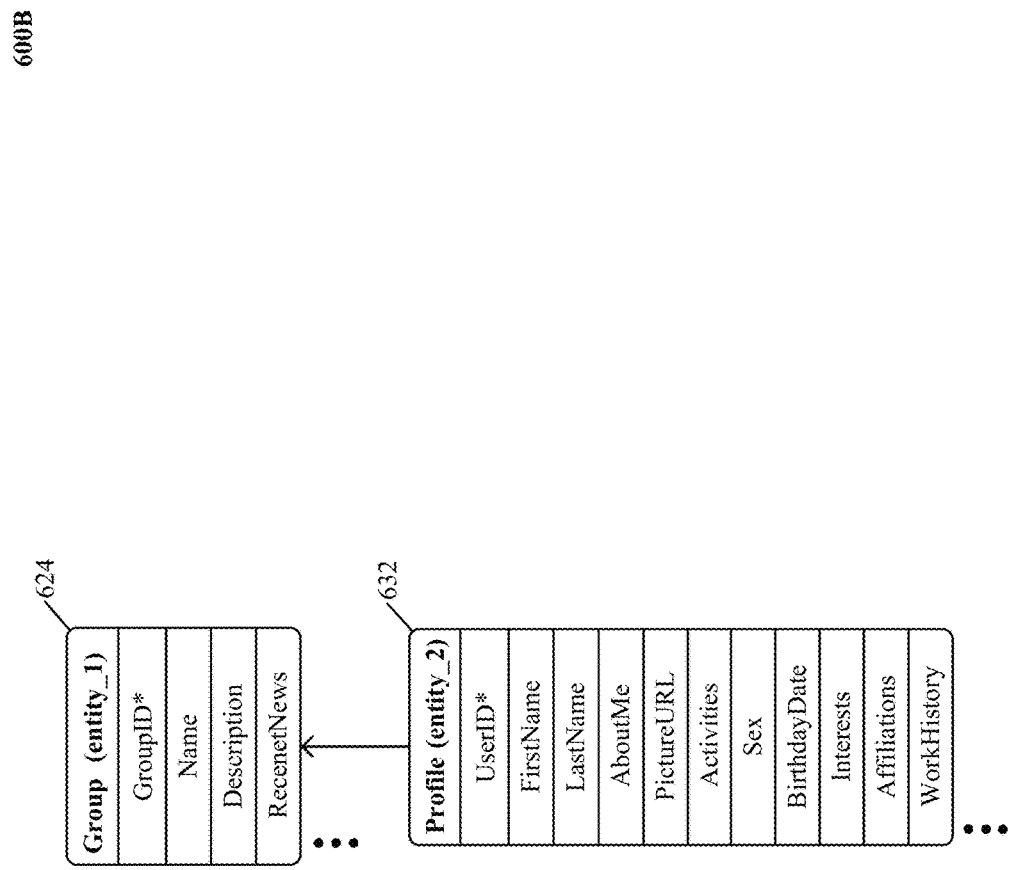
FIG. 6B – Connection Schema

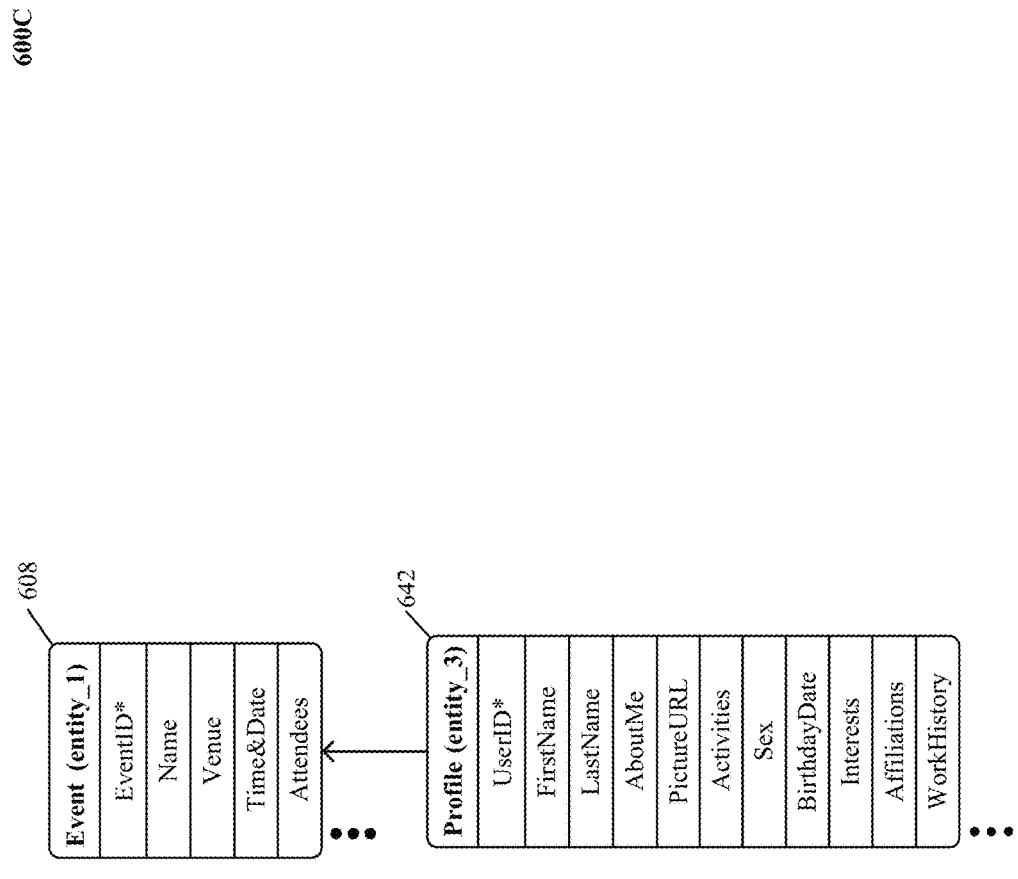
FIG. 6C – Connection Schema

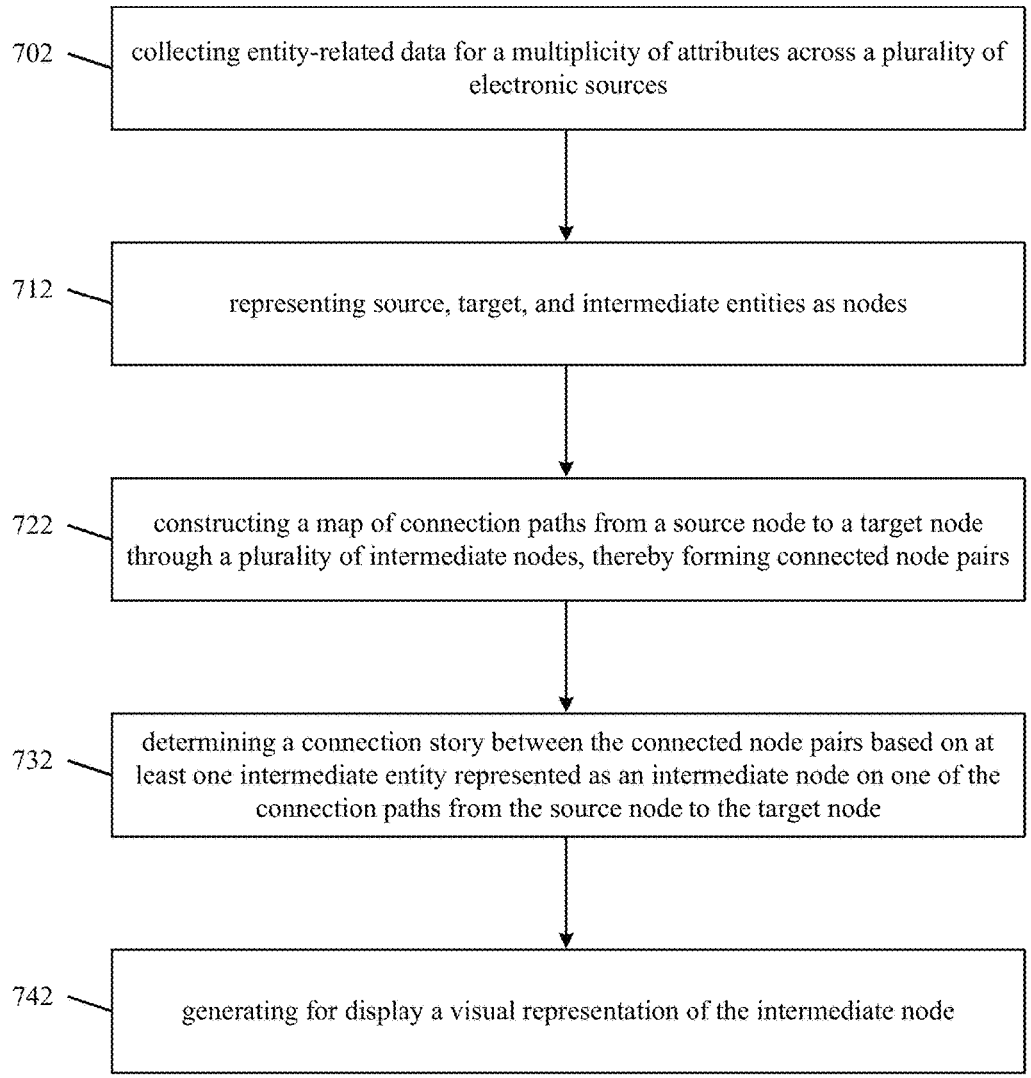
FIG. 7 – Determining Relationship Strength Between Entities

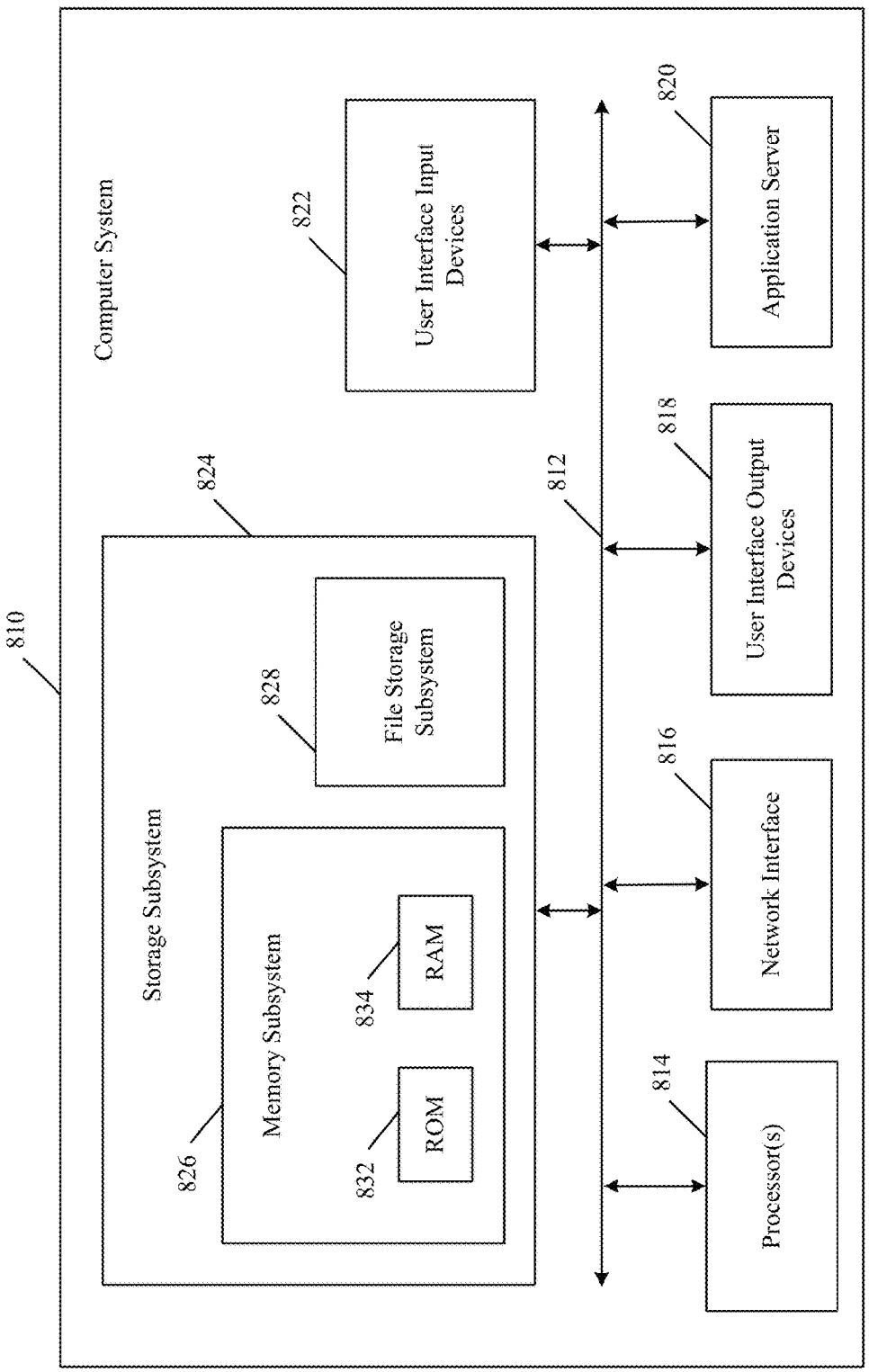
FIG. 8 – Computer System

INTER-ENTITY CONNECTION MAPS

RELATED APPLICATIONS

This application claims the benefit of four U.S. provisional Patent Applications, including: No. 61/896,650, entitled, "SYSTEMS AND METHODS OF SCRAPING MULTIPLE USER CONTACTS FROM AN ON-DEMAND SERVICE," filed 28 Oct. 2013; No. 61/896,653, entitled, "SYSTEMS AND METHODS OF ATIRIBUTE ANALYSIS FOR MICRO-TARGETING OF CUSTOMERS," filed 28 Oct. 2013; No. 61/896,655, entitled, "SYSTEMS AND METHODS OF IDENTIFYING SOCIAL CONNECTIONS BETWEEN ENTITIES IN ONLINE SOCIAL NETWORKS," filed 28 Oct. 2013; No. 61/896,656, entitled, "SYSTEMS AND METHODS OF IDENTIFYING TOPIC INFLUENCERS IN ONLINE SOCIAL ENVIRONMENTS," filed 28 Oct. 2013. The provisional applications are hereby incorporated by reference for all purposes.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

As the volume of information flowing on the web continues to increase, the need for automated tools that can assist users in receiving information valuable to them also increases. The information overload created by multitude of information sources, such as websites and social media sites, makes it difficult for users to know what piece of information is more suitable, relevant, or appropriate to their needs and desires. Also, a substantial portion of users' web surfing time is spent on separating information from noise.

In particular, service providers are continually challenged to deliver value and convenience to users by, for example, providing efficient search engines with high precision and low recall. One area of interest has been the development of finding and accessing desired content or search results relating to degree of separation between users. Currently, users locate content by forging through lengthy and exhausting search results. However, such methods can be time consuming and troublesome.

An opportunity arises to shift the burden of information filtering from users to automated systems and methods that automatically determine connection maps between users. Improved user experience and engagement and higher user satisfaction and retention may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 1 shows an example environment of generating inter-entity connections maps.

FIGS. 2A-2F illustrate an example of constructing a map of connection paths from a source entity to a target entity through an intermediate entity.

Figure 3A:
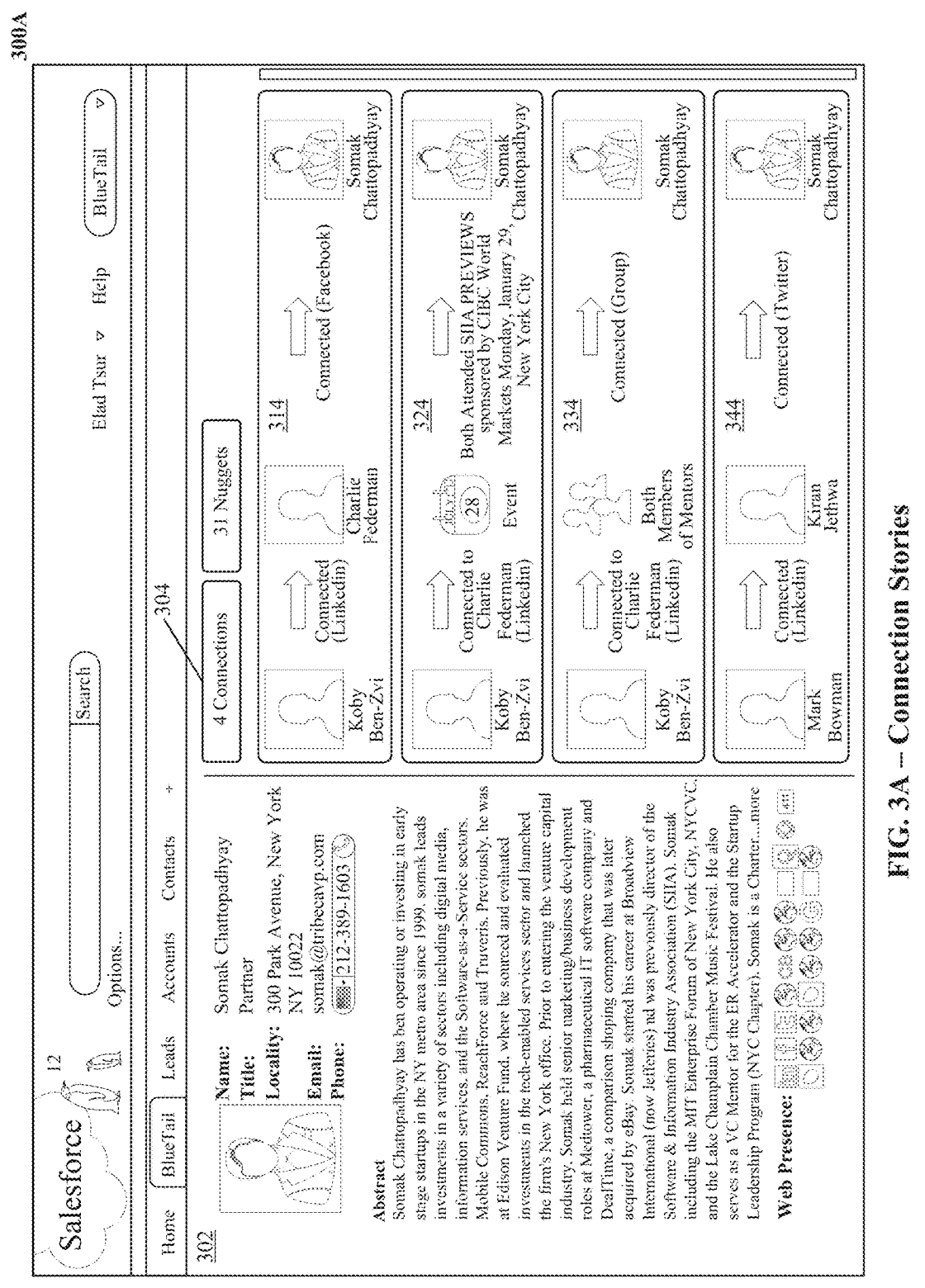
Figure 3C:
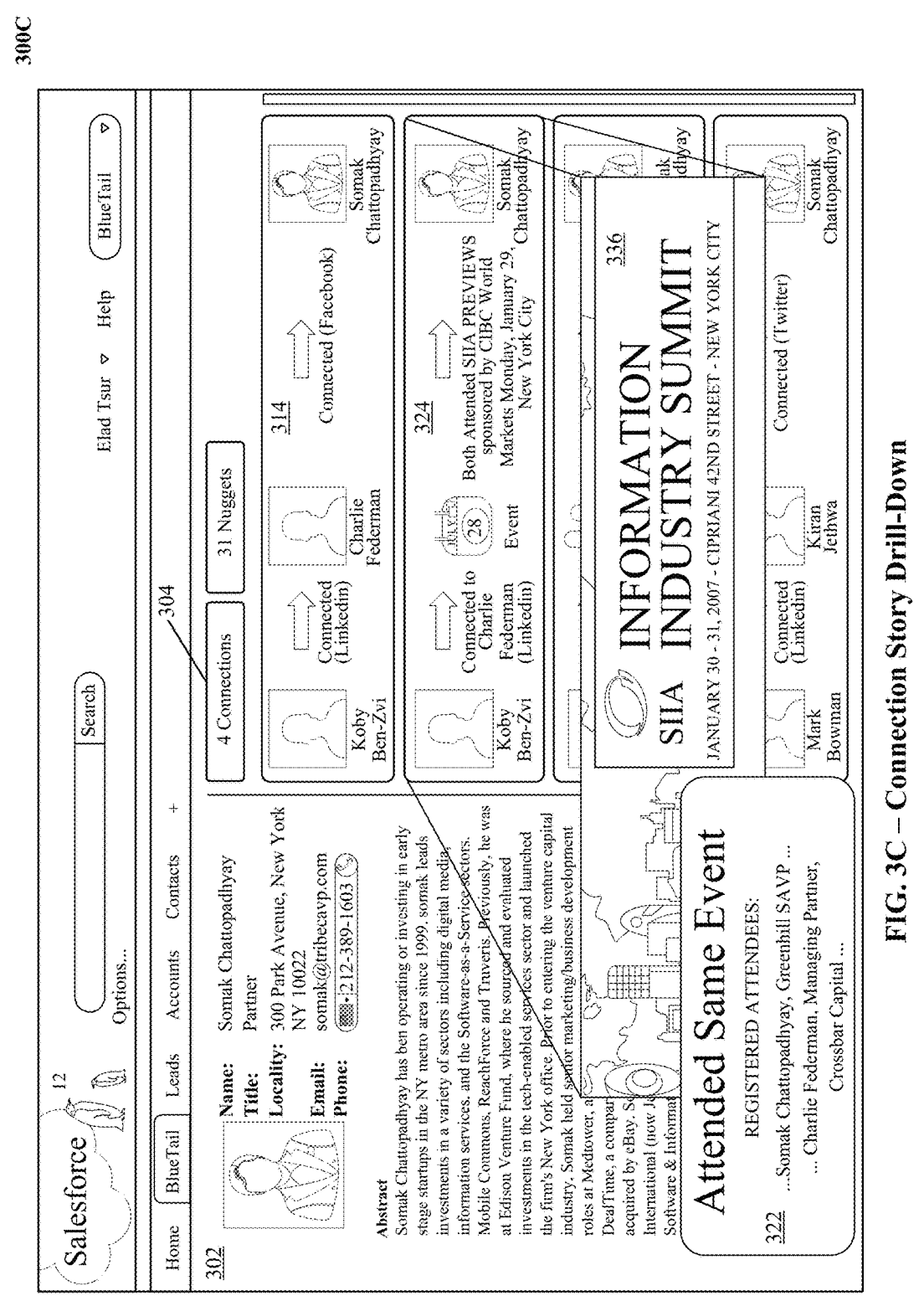

FIGS. 3A-3D depict an example of determining connection stories between the connected source and target entities.

FIG. 4A illustrates one implementation of a web page with user contacts.

FIG. 4B shows one implementation of XPath extraction of user contacts from the web page shown in FIG. 4A.

FIG. 5 illustrates one implementation of a whole domain automatic extraction in an online social environment.

FIG. 6A shows one implementation of a schema of a user profile.

FIGS. 6B-C illustrate one implementation of connection schemas.

FIG. 7 is a representative method of determining relationship strength between entities.

FIG. 8 is a block diagram of an example computer system used to generate inter-entity connection maps.

DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Introduction

Existing tools that describe the degrees of separation between entities are limited in their description and channels. For instance, the leading degrees of separation tool offered by LinkedIn® is limited to only LinkedIn® connections. In addition, none of the degrees of separation tools currently being offered utilize the metadata of the connections to graphically re-create the relationships between the entities.

The technology disclosed relates to identifying connection maps between entities (persons and organizations) and generating so-called connection stories between them based on the connection maps. The connection stories are graphic and visual representations of the connection paths that present to entities topological and chronological aspects of their relationships with other entities.

The technology disclosed also relates to scraping web pages that include multiple user contacts in a repeating structure. In particular, it relates to automatically deducing a common data structure implemented in a particular web page and automatically formulating XPath for navigating a parse of the particular web page to extract the multiple user contacts.

Connection Map Generation Environment

FIG. 1 shows an example environment 100 of generating inter-entity connections maps. FIG. 1 includes an entity data store 102 and connection data store 108. FIG. 1 also shows spidering engine 112, network(s) 115, connection engine 118, user computing device 122, application 124, and graphics engine 128. In other implementations, environment 100 may not have the same elements or components as those listed above and/or may have other/different elements or components instead of, or in addition to, those listed above, such as a web crawler, feed spider, feed analysis engine, resemblance measuring engine, strongly connected components engine, and cluster head engine. The different elements or components can be combined into single software modules and multiple software modules can run on the same hardware.

Network(s) 115 is any network or combination of networks of devices that communicate with one another. For example, network(s) 115 can be any one or any combination of a LAN (local area network), WAN (wide area network), telephone network (Public Switched Telephone Network (PSTN), Session Initiation Protocol (SIP), 3G, 4G LTE), wireless network, point-to-point network, star network, token ring network, hub network, WiMAX, WiFi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

In some implementations, the engines can be of varying types including workstations, servers, computing clusters, blade servers, server farms, or any other data processing systems or computing devices. The engines can be communicably coupled to the databases via different network connections. For example, spidering engine 112 can be coupled via the network 115 (e.g., the Internet) and connection engine 118 via a direct network link, and graphics engine 128 can be coupled by yet a different network connection.

In some implementations, databases or data stores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. In some implementations, user computing device 122 can be a personal computer, laptop computer, tablet computer, smartphone, personal digital assistant (PDA), digital image capture devices, and the like.

Application 124 can take one of a number of forms, including user interfaces, dashboard interfaces, engagement consoles, and other interfaces, such as mobile interfaces, tablet interfaces, summary interfaces, or wearable interfaces. In some implementations, it can be hosted on a web-based or cloud-based privacy management application running on a computing device such as a personal computer, laptop computer, mobile device, and/or any other hand-held computing device. It can also be hosted on a non-social local application running in an on-premise environment. In one implementation, application 124 can be accessed from a browser running on a computing device. The browser can be Chrome, Internet Explorer, Firefox, Safari, and the like. In other implementations, application 124 can run as an engagement console on a computer desktop application.

Each type of entity-related data source can be connected to web 114, which is crawled by a spidering engine 112 that searches the entity-related data sources and downloads and indexes entity-related data, including social media content and web data associated with business-to-business contacts. In some implementations, the spidering engine 112 can extract a list of contacts from a master database and search those contacts on entity-related data sources in order to determine if social or web content associated with contacts exists within those sources. If the sources provide positive matches to any of the contacts, the spidering engine 112 can store the retrieved social or web content in entity data store 102 for processing by connection engine 118.

In one implementation, an RSS crawling can be done by a single crawler that examines tens of thousands of feeds at least once a day for new content. The feed spider then compresses and stores the retrieved documents and metadata into a repository. Retrieved objects can be given ID numbers, such as Global Id's assigned whenever a new URL or data object embed is parsed out of an RSS feed. An indexer performs a number of functions. It reads the repository, checks for duplicates, and parses them. Each document can be organized with other data objects into a classification structure designated by the feed source.

In addition to the feed spider, an automated web crawler can be used selectively to crawl popular web sites only for content and useful metadata around data objects. This crawler can utilize a URL server that sends lists of URLs or pages for hosted data objects to be fetched to the crawlers. The web pages that are fetched are then sent to the indexer. The web crawler indexer performs another important function. It parses out all the links in every web page and stores important information about them in an anchors file. This file contains enough information to determine where each link points from and to, and the text of the link. Often the information retrieved through this method provides more data than is provided in the media RSS spec. Experience has shown that a well-maintained crawler can find about 350,000 videos a day, and crawl 50,000 to 100,000 RSS feeds a day.

Regarding different types of entity-related data sources, access controlled APIs like Yahoo Boss, Facebook® Open Graph, and Twitter® Firehose can provide real-time search data aggregated from numerous social media sources such as Yahoo, Facebook® and Twitter®. Invocations to access controlled APIs can initialize sorting, processing, and normalization of entity-related data. In other implementations, public internet can provide entity-related data from public sources such as first hand websites, blogs, web search aggregators, and social media aggregators.

In yet other implementations, social networking sites can provide entity-related data from social media sources such as Twitter®, Facebook®, LinkedIn®, and Klout®. Online social networks may allow a user to follow data objects in the form of records such as cases, accounts, or opportunities, in addition to following individual users and groups of users. One example of such an online social network is Chatter®, provided by salesforce.com™ of San Francisco, Calif. Such online social network can be implemented in various settings, including enterprises such as business organizations or groups within such an organization. For instance, Chatter® can be used by employee users of a business organization to communicate and collaborate with each other for various purposes.

Individual instances of entity-related data are referred to as entity mentions. Entity mentions can be online profiles, social handles, feed items, comments, endorsements (likes, follows, thumbs ups), unified resource locators (URLs), business-to-business contacts, etc. A "user profile" or "user's profile" is generally configured to store and maintain data about the user of the database system. The data can include general information, such as title, phone number, a photo, a biographical summary, and a status (e.g., text describing what the user is currently doing). As mentioned below, the data can include messages created by other users. Where there are multiple tenants, a user is typically associated with a particular tenant. For example, a user could be a salesperson of a company, which is a tenant of the database system that provides a database service.

A feed tracked update to a record or profile, such as a change to a field of the record. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. Other similar sections of a user's profile can also include an "About" section. A record can also have a status, the update of which can be provided by an owner of the record or other users having suitable write access permissions to the record. The owner can be a single user, multiple users, or a group. In one implementation, there is only one status for a record.

In one implementation, a comment can be made on any feed item. In another implementation, comments are organized as a list explicitly tied to a particular feed tracked update, post, or status update. In this implementation, comments may not be listed in the first layer (in a hierarchal sense) of feed items, but listed as a second layer branching from a particular first layer feed item.

The "following" of a record stored in a database allows a user to track the progress of that record. Updates to the record, also referred to herein as changes to the record, can occur and be noted on an information feed such as the record feed or the news feed of a user subscribed to the record. With the disclosed implementations, such record updates are often presented as an item or entry in the feed. Such a feed item can include a single update or a collection of individual updates. Information updates presented as feed items in an information feed can include updates to a record, as well as other types of updates such as user actions and events, as described herein. Examples of record updates include field changes in the record, as well as the creation of the record itself. Examples of other types of information updates, which may or may not be linked with a particular record depending on the specific use of the information update, include messages as described herein. Examples of such messages include posts such as explicit text or characters submitted by a user, multimedia data sent between or among users (for instance, included in a post), status updates such as updates to a user's status or updates to the status of a record, uploaded files, indications of a user's personal preferences such as "likes" and "dislikes," and links to other data or records. Information updates can also be group-related, e.g., a change to group status information for a group of which the user is one of possibly additional members. A user following, e.g., subscribed to, a record is capable of viewing record updates on the user's news feed, which can also include the other various types of information updates described above. Any number of users can follow a record and thus view record updates in this fashion. Some records are publicly accessible, such that any user can follow the record, while other records are private, for which appropriate security clearance/permissions are a prerequisite to a user following the record.

Online social networks are increasingly becoming a common way to facilitate communication between individuals and groups of individuals, any of whom can be recognized as "users" of a social networking system. In many social networks, individuals may establish connections with one other, which may be referred to as "friending" one another. By establishing such a connection, one user may be able to see information generated by or associated with another user. For instance, a first user may be able to see information posted by a second user to the first user's personal social network page. One implementation of such a personal social network page is a user's profile page, for example, in the form of a web page representing the user's profile. For example, a post submitted by the second user about the first user can be presented on the first user's profile feed, also referred to herein as the user's "wall," which can be displayed on the first user's profile page.

In some implementations, an information feed in the context of a social network may be a collection of information selected from the social network for presentation in a user interface. The information presented in the information feed may include posts to a user's wall or any other type of information accessible within the social network. A feed item can include various types of data including character-based data, audio data and/or video data. For instance, a post can include text in combination with a JPEG image or animated image. Feed items in information feeds such as a user's news feed may include messages, which can take the form of: posts comprising textual/character-based inputs such as words, phrases, statements, questions, emotional expressions, and/or symbols; responses to posts, also referred to herein as "comments", such as words, phrases, statements, answers, questions, and reactionary emotional expressions; indications of personal preferences which can be submitted as responses to posts or comments; status updates; and hyperlinks. In other examples, messages can be in the form of file uploads, such as presentations, documents, multimedia files, and the like.

In some implementations, a news feed may be specific to an individual user, a group of users, or a data object. For instance, a group of users on a social network may publish a news feed. Members of the group and the larger social network may view and post to the group news feed in accordance with a permissions configuration for the news feed and the group.

Entity data store 102 specifies holds entity-related data, including various entities (persons and organizations) such as contacts, accounts, opportunities, and/or leads and further provides business information related to the respective entities. Examples of business information can include names, addresses, job titles, number of employees, industry types, territories, market segments, contact information, employer information, stock rate, etc. In one implementation, entity data store 102 can store web or database profiles of the users and organizations as a system of interlinked hypertext documents that can be accessed via the network 115 (e.g., the Internet). In another implementation, entity data store 102 can also include standard profile information about persons and organizations. This standard profile information can be extracted from company websites, business registration sources such as Jigsaw, Hoovers, or D&B, business intelligence sources, and/or social networking websites like Yelp, Yellow Pages, etc.

Connection engine 118 constructs a map of connection paths between the entities by evaluating entity mentions and determining a degree of co-reference between the entity mentions. The degree of co-reference identifies whether an entity mention links two or more entities. A link can be based on a plurality of interactions between the entities and specified by the entity mentions. In one example, for a Facebook® message entity mention, a link between two or more entities is established by evaluating the names of the author and recipient(s) or endorsers of the Facebook® message entity mention such that the author and the recipient(s) or endorsers are linked to each other through at least one connection path. Other formats of correspondences, such has e-mail, tweet, post, comment, poke, like, etc. can be evaluated similarly. In another example, user profiles of two or more entities are evaluated to compare various respective fields such RSVPs, alma mater, employer name, industry type, job function, etc. to identify links between the two or more entities based on matching field values.

In some other implementations, connection engine 118 uses pattern matching, order matching, length matching, character type matching, sum matching, or other matching techniques to find text matches between entity mentions. One example of a match can be that a pattern of three characters appearing in a six character phrase of a first entity mention must appear in an eight character phrase of a second entity mention. Alternatively, the match can require that four characters appearing in consecutive order in a six character phrase of the first entity mention must appear in the same consecutive order in an eight character phrase of the second entity mention. A further match can be that alphanumeric characters appearing in certain positions of the first entity mention must correspond to alphanumeric characters appearing in the same positions of the second entity mention.

According to some implementations, connection engine 118 identifies feed items with common text mentions, including exact matches of company names and equivalent matches of company names variants. In another implementation, connection engine 118 removes any stop words from the feed items to facilitate efficient comparison of the feed items, preferably before identifying common company-name mentions.

In other implementations, a degree of co-reference between feed items is further determined based on common token occurrences in the feed items that are identified as belonging to a same entity or entity attribute such as job titles, job functions, industry types, etc. A "token" refers to any of a variety of possible language units, such as a word, a phrase, a number, a symbol, or the like, that represents a smallest unit of language that conveys meaning. In one implementation, a feed item can be decomposed into one or more tokens using a tokenizer, which represents a set of language specific rules that define a boundary of a token.

Based on the map of the connection paths, connection engine 118 computes connection stories between the entities. A map of the connection paths includes a source entity, an intermediate entity, and a target entity, in some implementations. Connection engine 118 translates how the source entity is connected to the target entity through the intermediate entity by identifying the respective connection paths between the source, intermediate, and target entities. The connection paths describe the relationships between the source, intermediate, and target entities. For instance, the source entity can be connected to the intermediate entity by a one degree of connectedness and the intermediate entity can be connected to the target entity by three degrees of connected ness. Based on this connectedness information, the connection engine 118 can determine a connection path between the source and the target entity. In other implementations, the source and target entities are connected to each other via a plurality of intermediate entities such that source entity can be connected to a first intermediate entity and the first intermediate entity can be connected to a second intermediate entity, which is further connected to the target entity. In yet other implementations, different combinations of the source, intermediate, and target entities can be used to compute the map of connection paths between the source and the target entities.

Once connection paths between entities are determined, they are stored in connection data store 108. The connection data store 108 identifies how a source entity is connected to a target entity. This include assigning unique entity IDs to the source, intermediate, and target entities, assigning unique path IDs to each connection path between two entities, and assigning unique map IDs to each connection map between source, intermediate, and target entities. In some implementations, connection data store 108 captures the nature of a connection path between entities by specifying whether the entities share a common group membership, attended a same event, went to a same educational institution, exchanged correspondences or feed posts, etc. In addition, it also maintains metadata associated with each connection path, including authors and recipients of feed pots, names, locations, venues, timestamps of events, names and purposes of groups, and names of alma maters.

Graphics engine 128 is configured to generate graphics that can be displayed by the user computing device 122. Graphics engine 128 generates and provides data representative of widgets, which can be launched or executed in response to a predetermined user input signal. The widgets can be generated by the graphics engine 128 using a declaratory markup language such as HTML, XML, XHTML, or SGML and an imperative language such as a scripting programming language like JavaScript.

In one implementation, graphics engine 128 generates visual representations of connections stories between entities based on maps of connection paths between the entities. The connections stories can include topological and chronological representations of the connection paths. The topological and chronological representations of the connection paths can be made using formatted text and bitmap graphics as well as vector graphics (2D and 3D). In other implementations, the connection stories can also include user interaction elements such as hyperlinks, text fields, controls, checkboxes, list boxes, drop downs, and the like. In yet other implementations, the connection stories can include links to external websites or social networking sites and provide a contained preview of information within the websites or social networking sites that include the entity mentions or otherwise relate to the connection paths.

In one implementation, graphics engine 128 generates the connection stories by accessing a plurality of common or canonical library resources for console interfaces and other applications. Examples of such library resources include JavaScript, images, and cascaded style sheets (CSS). In one implementation, library resources are stored as computer readable code written in any programming language. Some examples of languages that can be used include C, AJAX, Python, JSON, C++, or JAVA. The software programs can be further translated into machine language or virtual machine instructions and stored in a program file in that form. The program file can then be stored on or in one or more of the articles of manufacture, according to other implementations.

Inter-Entity Connection Map

FIGS. 2A-2F illustrate an example of constructing a map 200A-F of connection paths from a source entity to a target entity through an intermediate entity. In the example shown in FIGS. 2A-2F, a connection path between a source entity node 202 named "Hank Mario" and a target entity node 208 name "Charlie Rife" is determined. FIG. 2A shows that the source entity node 202 is not directly connected to the target entity node 208. In FIG. 2B, an intermediate entity node 206 named "Karen Runkle" is found to be connected with the source entity node 202. The connection path 212 between the source entity node 202 and the intermediate entity node 206 is based on six message exchanges between them on an online social network like Facebook®.

In addition, the source entity 202 and the intermediate entity 206 are associated with a same educational institution called "Fuller College of Business," as shown in FIG. 2C. This connection path 214 is established by finding an entity mention 216 about intermediate entity 206 that specifies that intermediate entity 206 is a patron of the Fuller College of Business.

In FIG. 2D, a connection path 218 is established between the intermediate entity 206 and the target entity 208 based on the entity mention 220 associated with the target entity 208 via connection path 222. Entity mention 220 specifies that the intermediate entity 205 co-attended an event with the target entity 208.

FIG. 2E shows that, according to entity mention 226, the intermediate entity 206 commented on a blog authored by the target entity 208. Connection path 224 specifies the relationship between the target entity 208 and the entity mention 226 and connection path 228 specifies the relationship between the intermediate entity 206 and the entity mention 226.

FIG. 2F illustrates that the target entity 208 and the intermediate entity 206 work in the same industry (marketing) and hence have a connection path 230. FIG. 2F also shows the map of connection paths 212 and 230 between the connected source, intermediate, and target entity pairs.

Connection Story

FIGS. 3A-3D depict an example of determining connection stories 300A-D between the connected source and target entities. In particular, FIGS. 3A-3D graphically depict how a source entity 302 named "Somak Chattopadhyay" is connected to various target entities. FIG. 3A shows four connections stories 304 associated with the source entity 302. According to connection story 314, source entity Somak Chattopadhyay is connected to an intermediate entity named "Charlie Federman" on Facebook®, who is in turn connected to a target entity named "Koby Ben-Zvi" on LinkedIn®. According to connection story 324, source entity Somak Chattopadhyay attended an event with the intermediate entity Charlie Federman on July 28th. It also shows that the intermediate entity Charlie Federman is connected to the target entity Koby Ben-Zvi on LinkedIn®. According to connection story 334, source entity Somak Chattopadhyay shares a group membership with the intermediate entity Charlie Federman. It also shows that the intermediate entity Charlie Federman is connected to the target entity Koby Ben-Zvi on LinkedIn®. According to connection story 344, source entity Somak Chattopadhyay is connected to an intermediate entity named "Kiran Kethwa" on Twitter®, who is in turn connected to a target entity named "Mark Bowman" on LinkedIn®.

FIG. 3B illustrates that selecting a particular connection story can generate a preview of the corresponding entity mention used to generate the particular connection story. In the example show in FIG. 3B, according to connection story 334, source entity Somak Chattopadhyay shares a group membership with the intermediate entity Charlie Federman. Selecting the connection story 334 brings up a snippet 312 of the website, which specifies the connection path 332 that the source entity Somak Chattopadhyay and the intermediate entity Charlie Federman are both mentors in a same group. Similarly, in FIG. 3C, snippet 322 of a website 336 is presented to identify the event co-attended by the source and intermediate entities. FIG. 3D shows that more than one connection story can be simultaneously presented.

XPath Extraction

FIG. 4A illustrates one implementation of a web page 400A with user contacts. As shown in FIG. 4A, the technology disclosed can crawl a webpage of an organization 408 named "Salesforce" that includes executive profiles 402 and 412 of various executives working for Salesforce. In some implementations, the technology disclosed can extract the core content of the web page (HTML document) using a text blocks analyzer that identifies HTML tags as delimiters of the web page 400A. Useful basic structure of text fragments in separate text blocks can be extracted using a text blocks checker. In other implementations, a text blocks parser can identify text blocks that do not include text fragments and sequentially output the remaining text blocks as core contents of the web page 400A.

In yet other implementations, HTML delimiters such as <p>, <div>, <br>, <li>, <; hr>, and <pre>, etc. can be used for recognizing structure of the text blocks. For instance, in FIG. 4A, HTML structure of web page 400A is used to extract biographical information of contacts named "Peter Ross" and "Ethan Craven."

FIG. 4B shows one implementation of XPath extraction 400B of user contacts from the web page shown in FIG. 4A. In some implementations, the technology disclosed can automatically deduce a common data structure implemented in multiple instances of biographical information of contacts on web page 400A by analyzing its HTML or XML structure. In one implementation, it can automatically generate an XPath that selects nodes or node sets in the web page 400A using path expressions. In another implementation, it can record a position of the extracted content in a DOM structure and automatically generate an XPath path that includes tag name information and shift information from a DOM root node level-by-level down to a target node. In one example, FIG. 4A shows XPath instructions 416 that navigate a parse of the HTML structure in web page 400A to reach the multiple instances of biographical information on the web page 400A.

The following code shows the repeating HTML structure in web page 400A that is used to generate the XPath 416 from which biographical information of contacts, Peter Ross and Ethan Craven, is extracted:

```
<div class="LayoutBreakAfter VerticalBarOverflow"><div
class="LayoutGrid-1-2 LayoutSlimGrid-1-2"><div class="ttt
section"><div class="LayoutCellSides" style=" ">
    <div id="content-dotcom-en-leaders-bodycontent1-ttt"
style="padding-left:69px;" class="LayoutSlimGridReset
LayoutBreakAfter LayoutPullout">
    <div
style="width:58px;float:left;clear:left;position:relative;left:-
69px;margin-right:-69px" class="PulloutItem
LayoutSlimGridColReset">
        <div>
            <a href="/leaders/peter-ross.html"
target="_self"><img title="Peter Ross" alt="Peter Ross" class="cq-dd-
image ImageShadow LayoutRow LayoutImage"
src="http://wwwimages.salesforce.com/www.salesforce.com/content/
dam/Salesforce/en/leaders/images/58x43/salesforce-leaders-overview-
peter-ross-58x43.jpg.adimg.mw.58.png"/></a></div>
        </div><div style="float:left;width:100%"
class="TextSmall PulloutItem LayoutSlimGridColReset">
    <div class="LayoutRow">
        <h3 class="TextH5 LayoutSmallRowBottom">
```

-continued

```
                                   <a href="/leaders/peter-ross.html"
target="_self"></a></h3>
<div class="LayoutSmallRow">
        <p><b>Peter Ross </b></p>
<p>President and Chief Executive Officer</p>
<p><a href="/leaders/peter-ross.html">Executive profile</a> | <a
href="/leaders/peter-ross /bio.html">Bio</a></p>
</div>
     </div>
        </div>
</div>
</div>
</div>
</div><div class="LayoutGrid-3-4 LayoutSlimGrid-1-2"><div
class="ttt section"><div class="LayoutCellSides" style=" ">
     <div id="content-dotcom-en-leaders-bodycontent1-ttt-0"
style="padding-left:69px;" class="LayoutSlimGridReset
LayoutBreakAfter LayoutPullout">
     <div
style="width:58px;float:left;clear:left;position:relative;left:-
69px;margin-right:-69px" class="PulloutItem
LayoutSlimGridColReset">
     <div>
<div class="LayoutBreakAfter VerticalBarOverflow"><div
class="LayoutGrid-1-2 LayoutSlimGrid-1-2"><div class="ttt
section"><div class="LayoutCellSides" style=" ">
     <div id="content-dotcom-en-leaders-bodycontent1-ttt"
style="padding-left:69px;" class="LayoutSlimGridReset
LayoutBreakAfter LayoutPullout">
     <div
style="width:58px;float:left;clear:left;position:relative;left:-
69px;margin-right:-69px" class="PulloutItem
LayoutSlimGridColReset">
     <div>
           <a href="/leaders/ethan-craven.html"
target="_self"><img title="Ethan Craven" alt="Ethan Craven"
class="cq-dd-image ImageShadow LayoutRow LayoutImage"
src="http://wwwimages.salesforce.com/www.salesforce.com/content/
dam/Salesforce/en/leaders/images/58x43/salesforce-leaders-overview-
ethan-craven-58x43.jpg.adimg.mw.58.png"/></a></div>
        </div><div style="float:left;width:100%"
class="TextSmall PulloutItem LayoutSlimGridColReset">
     <div class="LayoutRow">
        <h3 class="TextH5 LayoutSmallRowBottom">
                         <a href="/leaders/ethan-craven.html"
target="_self"></a></h3>
     <div class="LayoutSmallRow">
        <p><b> Ethan Craven </b></p>
<p>Chief Technology Officer</p>
<p><a href="/leaders/ethan-craven.html">Executive profile</a> | <a
href="/leaders/ethan-craven /bio.html">Bio</a></p>
</div>
     </div>
        </div>
</div>
</div>
</div>
</div><div class="LayoutGrid-3-4 LayoutSlimGrid-1-2"><div
class="ttt section"><div class="LayoutCellSides" style=" ">
     <div id="content-dotcom-en-leaders-bodycontent1-ttt-0"
style="padding-left:69px;" class="LayoutSlimGridReset
LayoutBreakAfter LayoutPullout">
     <div
style="width:58px;float:left;clear:left;position:relative;left:-
69px;margin-right:-69px" class="PulloutItem
LayoutSlimGridColReset">
     <div>
```

In some implementations, a seed contact that includes one or more core attributes of a real-world entity such as a name, job title, employer name, contact information, etc. can be used to provide a query criterion for an XQuery. Based on the structure of the seed contact, attributes of other contacts that share similar structure as the seed contact can be extracted from one or more person-related data sources. In other implementations, the newly extracted contact attributes can serve as core, supplemental, or meta attributes for receiving search results with higher precision and greater recall.

FIG. 5 illustrates one implementation of a whole domain automatic extraction 500 in an online social network 502, such as Chatter®. In one implementation, the technology disclosed can identify a pattern in which contact information is stored in a social profile of a user named "Juan Keown." The technology disclosed can then use this pattern to extract biographical information of other contacts 512 and 522 in the social network of the user or on the online social network 502.

Data Objects

FIG. 6A shows one implementation of a schema 600A of a user profile. This and other data structure descriptions that are expressed in terms of objects can also be implemented as tables that store multiple records or object types. Reference to objects is for convenience of explanation and not as a limitation on the data structure implementation. FIG. 6A shows a profile object 616 linked to event object 608, feed object 618, connection object 628, group object 624, and photo object 604. Photo object 604 is further linked to photo album object 602 and photo tag object 614. In other implementations, user profile schema 600A may not have the same objects, tables, fields or entries as those listed above and/or may have other/different objects, tables, fields or entries instead of, or in addition to, those listed above such as a work object, education object, or contact information object.

Profile object 616 provides primary information that identifies a user and includes various fields that store biographic information about a user such as first name, last name, sex, birthday, work history, interests, and the like. The profile object 616 is further linked to other objects that provide supplementary information about the user. For instance, profile object 616 is linked to an event object 608 that stores information related to events subscribed, checked-in, or attended by the user. In one implementation, profile object 616 is linked to a feed object 618 that specifies various feeds items such as posts, comments, replies, mentions, etc. posted by the user or on user's profile.

In another implementation, profile object 616 is linked to a connection object 628 that provides information about other persons in the social network of the user. In one implementation, profile object 616 is linked to a group object 624 that identifies the groups the user is part of. In yet another implementation, profile object 616 is linked to a photo object 604 that identifies an image, which is uploaded, posted, or selected by the user. The photo object 604 is further linked to a photo album object 602 that categorizes the image and to a photo tag object 614 that describes the image.

In yet another implementation, schema 600A can have one or more of the following variables with certain attributes: USER_ID being CHAR (15 BYTE), IMAGES_ID being CHAR (15 BYTE), EVENT_ID being CHAR (15 BYTE), GROUP_ID being CHAR (15 BYTE), CONNECTION_ID being CHAR (15 BYTE), FEED_ITEM_ID being CHAR (15 BYTE), CREATED_BY being CHAR (15 BYTE), CREATED_DATE being DATE, and DELETED being CHAR (1 BYTE).

FIGS. 6B-C show one implementation of connection schemas 600B-C. In particular, FIG. 6B shows one example of capturing a connection path between two entities such that the two entities share a common group membership. This is achieved by linking a group object 624 of a first entity with a profile object 632 of a second entity. FIG. 6C shows one example of capturing a connection path between two entities such that the two entities co-attended an event. This is achieved by linking an event object 608 of the first entity with a profile object 642 of a third entity.

Flowchart

FIG. 7 is a representative method 700 of determining relationship strength between entities. Flowchart 700 can be implemented at least partially with a database system, e.g., by one or more processors configured to receive or retrieve information, process the information, store results, and transmit the results. Other implementations may perform the actions in different orders and/or with different, varying, alternative, modified, fewer or additional actions than those illustrated in FIG. 7. Multiple actions can be combined in some implementations. For convenience, this flowchart is described with reference to the system that carries out a method. The system is not necessarily part of the method.

At action 702, entity-related data is collected for a multiplicity of attributes across a plurality of electronic sources. In one implementation, the electronic sources include at least one of access controlled application programming interfaces (APIs), public Internet, and social networking environments.

In some implementations, the multiplicity of attributes include at least one of biographical information, job titles, job functions, employer names, work departments, industry names, event attendances, posted feed items, endorsed feed items, group memberships, and correspondences.

At action 712, source, target, and intermediate entities are represented as nodes. The source, target, and intermediate entities can be real-world person or organizations with presence on the Internet.

At action 722, a map of connection paths is constructed from a source node to a target node through a plurality of intermediate nodes, thereby forming connected node pairs. In one implementation, one or more edges connecting the intermediate node to the source or target node represent a correspondence exchange between the intermediate entity and a respective source or target entity and represent an event co-attended by the intermediate entity and the respective source or the target entity.

In another implementation, one or more edges connecting the intermediate node to the source or target node represent a feed item posted by the intermediate entity in response to another feed item posted by a respective source or target entity and represent at least one event co-attended by the intermediate entity and the respective source or the target entity.

In yet another implementation, one or more edges connecting the intermediate node to the source or target node represent a feed item posted by the intermediate entity in response to another feed item posted by a respective source or target entity and represent at least one correspondence exchange between the intermediate entity and the respective source or target entity.

In a further implementation, one or more edges connecting the intermediate node to the source or target node represent a feed item posted by the intermediate entity in response to another feed item posted by a respective source or target entity and represent at least one common group membership between the intermediate entity and the respective source or target entity.

In some other implementation, one or more edges connecting the intermediate node to the source or target node represent an endorsement by the intermediate entity of a feed item posted by a respective source or target entity and represent at least one correspondence exchange between the intermediate entity and the respective source or target entity.

In a further implementation, one or more edges connecting the intermediate node to the source or target node represent an endorsement by the intermediate entity of a feed item posted by a respective source or target entity and represent at least one educational institution co-attended by the intermediate entity and the respective source or target entity.

In yet another implementation, one or more edges connecting the intermediate node to the source or target node represent a common employer of the intermediate entity and a respective source or target entity and represent at least one event co-attended by the intermediate entity and the respective source or target entity.

In another implementation, one or more edges connecting the intermediate node to the source or target node represent a common job function of the intermediate entity and a respective source or target entity and represent at least one feed item posted by the intermediate entity in response to another feed item posted by the respective source or target entity.

In one implementation, one or more edges connecting the intermediate node to the source or target node represent a common work department of the intermediate entity and a respective source or target entity and represent at least one common group membership between the intermediate entity and the respective source or target entity.

In another implementation, one or more edges connecting the intermediate node to the source or target node represent a common work industry of the intermediate entity and a respective source or target entity and represent at least one correspondence exchange between the intermediate entity and the respective source or target entity.

In yet another implementation, one or more edges connecting the intermediate node to the source or target node represent a common job title of the intermediate entity and a respective source or target entity and represent at least one endorsement by the intermediate entity of a feed item posted by the respective source or target entity.

At action 732, a connection story is determined between the connected node pairs based on at least one intermediate entity represented as an intermediate node on one of the connection paths from the source node to the target node. In one implementation, the connection story is a graphic and visual representation of the topological and chronological aspects of the connection paths between the source, target, and intermediate entities.

At action 742, a visual representation of the intermediate node is generated for display. In one implementation, graphics engine 128 includes a tweening engine and tweening stepper that work together to generate pixel-level instructions—intermediate frames between two images that give the appearance that the first image evolves smoothly into the second image. That is, a shape can be described by a radius and an angle. The tweening engine calculates the locations for the pixels and the tweening stepper delivers an animation projection sequence about the intermediate node for morphing a display panel from a first visualization interface element to a second visualization interface element. The projections between the start and destination frames create the illusion of motion that gets displayed on the user interface when a user selects the intermediate node.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application such as connection map generation environment, inter-entity connection maps, connection story, XPath extraction, data objects, etc.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Computer System

FIG. 8 is a block diagram of an example computer system 800 used to generate inter-entity connection maps. Computer system 810 typically includes at least one processor 814 that communicates with a number of peripheral devices via bus subsystem 812. These peripheral devices can include a storage subsystem 824 including, for example, memory devices and a file storage subsystem, user interface input devices 822, user interface output devices 818, and a network interface subsystem 816. The input and output devices allow user interaction with computer system 810. Network interface subsystem 816 provides an interface to outside networks, including an interface to corresponding interface devices in other computer systems.

User interface input devices 822 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 810.

User interface output devices 818 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules and methods described herein. These software modules are generally executed by processor 814 alone or in combination with other processors.

Memory 826 used in the storage subsystem can include a number of memories including a main random access memory (RAM) 834 for storage of instructions and data during program execution and a read only memory (ROM) 832 in which fixed instructions are stored. A file storage subsystem 828 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 828 in the storage subsystem 824, or in other machines accessible by the processor.

Bus subsystem 812 provides a mechanism for letting the various components and subsystems of computer system 810 communicate with each other as intended. Although bus subsystem 812 is shown schematically as a single bus, alternative implementations of the bus subsystem can use multiple busses. Application server 820 can be a framework that allows the applications of computer system 800 to run, such as the hardware and/or software, e.g., the operating system.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as one example. Many other configurations of computer system 810 are possible having more or fewer components than the computer system depicted in FIG. 8.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of determining relationship strength between entities, the method including:
    collecting by a computer entity-related data for a multiplicity of attributes across a plurality of electronic sources;
    representing by a computer a source person, a target person, and intermediate entities as nodes including a source node, a target node and a plurality of intermediate nodes;
    constructing by a computer a map of connection paths from the source node to the target node through the plurality of intermediate nodes, thereby forming connected node pairs;
    determining by a computer a connection story that describes a nature of connecting interactions along intermediate nodes in the connection paths from the source node to the target node;
    wherein the determining a connection story that describes the nature of connecting interactions includes:
        (i) crawling by a crawler implemented on the computer that extracts connection metadata from plurality of person related data sources, which connection metadata identifies online connection interactions between users, online mentions by users of other entities, co-attended events, and co-mentions together in a same data source,
        (ii) analyzing the connection metadata extracted by the crawler to identify for each connection: (a) a platform where the detected connection was formed and (b) platform characteristics associated with an environment of the platform, including at least one of event attendance information and group mentorship information, to obtain a degree of relatedness between a user and another entity in the connection, and (iii) adding to the connection story ordered by the degree of relatedness between the user and the another entity, a connection including the user, the another entity, and the platform characteristics related to the platform from which the user and the another entity information was extracted; and generating by a computer for display a visual representation of the connection story built from the plurality of connections.

2. The method of claim 1, wherein the electronic sources include at least one of access controlled application programming interfaces (APIs), public Internet, and social networking environments.

3. The method of claim 1, wherein the multiplicity of attributes include at least one of biographical information, job titles, job functions, employer names, work departments, industry names, event attendances, posted feed items, endorsed feed items, group memberships, and correspondences.

4. The method of claim 1, wherein one or more edges connecting the intermediate node to the source or target node represent a correspondence exchange between the intermediate entity and a respective source or target entity and represent an event co-attended by the intermediate entity and the respective source or the target entity.

5. The method of claim 1 wherein one or more edges connecting the intermediate node to the source or target node represent a feed item posted by the intermediate entity in response to another feed item posted by a respective source or target entity and represent at least one event co-attended by the intermediate entity and the respective source or the target entity.

6. The method of claim 1, wherein one or more edges connecting the intermediate node to the source or target node represent a feed item posted by the intermediate entity in response to another feed item posted by a respective source or target entity and represent at least one correspondence exchange between the intermediate entity and the respective source or target entity.

7. The method of claim 1, wherein one or more edges connecting the intermediate node to the source or target node represent a feed item posted by the intermediate entity in response to another feed item posted by a respective source or target entity and represent at least one common group membership between the intermediate entity and the respective source or target entity.

8. The method of claim 1, wherein one or more edges connecting the intermediate node to the source or target node represent an endorsement by the intermediate entity of a feed item posted by a respective source or target entity and represent at least one correspondence exchange between the intermediate entity and the respective source or target entity.

9. The method of claim 1, wherein one or more edges connecting the intermediate node to the source or target node represent an endorsement by the intermediate entity of a feed item posted by a respective source or target entity and represent at least one educational institution co-attended by the intermediate entity and the respective source or target entity.

10. The method of claim 1, wherein one or more edges connecting the intermediate node to the source or target node represent a common employer of the intermediate entity and a respective source or target entity and represent at least one event co-attended by the intermediate entity and the respective source or target entity.

11. The method of claim 1, wherein one or more edges connecting the intermediate node to the source or target node represent a common job function of the intermediate entity and a respective source or target entity and represent at least one feed item posted by the intermediate entity in response to another feed item posted by the respective source or target entity.

12. The method of claim 1, wherein one or more edges connecting the intermediate node to the source or target node represent a common work department of the intermediate entity and a respective source or target entity and represent at least one common group membership between the intermediate entity and the respective source or target entity.

13. The method of claim 1, wherein one or more edges connecting the intermediate node to the source or target node represent a common work industry of the intermediate entity and a respective source or target entity and represent at least one correspondence exchange between the intermediate entity and the respective source or target entity.

14. The method of claim 1, wherein one or more edges connecting the intermediate node to the source or target node represent a common job title of the intermediate entity and a respective source or target entity and represent at least one endorsement by the intermediate entity of a feed item posted by the respective source or target entity.

15. A system of determining relationship strength between entities, the system including:

a hardware processor and a non-transitory computer readable storage medium storing computer instructions configured to cause the hardware processor to:

collect entity-related data for a multiplicity of attributes across a plurality of electronic sources;

represent a source person, a target person, and intermediate entities as nodes including a source node, a target node and a plurality of intermediate nodes;

construct a map of connection paths from the source node to the target node through the plurality of intermediate nodes, thereby forming connected node pairs;

determine a connection story that describes a nature of connecting interactions along intermediate nodes in the connection paths from the source node to the target node;

wherein the determine a connection story that describes the nature of connecting interactions includes:

(i) crawling by a crawler implemented on the computer that extracts connection metadata from plurality of person related data sources, which connection metadata identifies online connection interactions between users, online mentions by users of other entities, co-attended events, and co-mentions together in a same data source, (ii) analyzing the connection metadata extracted by the crawler to identify for each connection: (a) a platform where the detected connection was formed and (b) platform characteristics associated with an environment of the platform, including at least one of event attendance information and group mentorship information, to obtain a degree of relatedness between a user and another entity in the connection, and (iii) adding to the connection story ordered by the degree of relatedness between the user and the another entity, a connection including the user, the another entity, and the platform characteristics related to the platform from which the user and the another entity information was extracted; and generate for display a visual representation of the connection story built from the plurality of connections.

16. The system of claim 15, wherein one or more edges connecting the intermediate node to the source or target node represent a correspondence exchange between the intermediate entity and a respective source or target entity and represent an event co-attended by the intermediate entity and the respective source or the target entity.

17. The system of claim 15, wherein one or more edges connecting the intermediate node to the source or target node represent a feed item posted by the intermediate entity in response to another feed item posted by a respective source or target entity and represent at least one event co-attended by the intermediate entity and the respective source or the target entity.

18. The system of claim 15, wherein one or more edges connecting the intermediate node to the source or target node represent a feed item posted by the intermediate entity in response to another feed item posted by a respective source or target entity and represent at least one correspondence exchange between the intermediate entity and the respective source or target entity.

19. The system of claim 15, wherein one or more edges connecting the intermediate node to the source or target node represent a feed item posted by the intermediate entity in response to another feed item posted by a respective source or target entity and represent at least one common group membership between the intermediate entity and the respective source or target entity.

20. The method of claim 1, wherein the visual representation further includes a user interaction element that links to a preview, either live or extracted from a web site, that illustrates a connecting interaction along the connection path through respective intermediate nodes.

* * * * *